(12) United States Patent
Mikazuki et al.

(10) Patent No.: US 10,981,601 B2
(45) Date of Patent: Apr. 20, 2021

(54) IMPACT-ABSORBING MEMBER AND SIDE MEMBER OF AUTOMOBILE

(71) Applicant: NIPPON STEEL CORPORATION, Tokyo (JP)

(72) Inventors: Yutaka Mikazuki, Tokyo (JP); Eiji Isogai, Tokyo (JP); Seiya Ishii, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 48 days.

(21) Appl. No.: 16/496,340

(22) PCT Filed: Mar. 31, 2017

(86) PCT No.: PCT/JP2017/013566
§ 371 (c)(1),
(2) Date: Sep. 20, 2019

(87) PCT Pub. No.: WO2018/179321
PCT Pub. Date: Oct. 4, 2018

(65) Prior Publication Data
US 2020/0039585 A1 Feb. 6, 2020

(51) Int. Cl.
*B62D 21/15* (2006.01)
*B62D 25/08* (2006.01)

(52) U.S. Cl.
CPC ......... *B62D 21/157* (2013.01); *B62D 21/152* (2013.01); *B62D 25/08* (2013.01)

(58) Field of Classification Search
CPC .... B62D 21/15; B62D 21/152; B62D 21/157; B62D 25/08
See application file for complete search history.

(56) References Cited

U.S. PATENT DOCUMENTS 10,407,101 B2 * 9/2019 Otsuka ................ B62D 29/007

FOREIGN PATENT DOCUMENTS

| JP | 5-105110 A | 4/1993 |
| JP | 6-135355 A | 5/1994 |

(Continued)

OTHER PUBLICATIONS

International Preliminary Report on Patentability and Written Opinion of the International Searching Authority, dated Oct. 1, 2019, for International Application No. PCT/JP2017/013566, along with an English translation of the Written Opinion of the International Searching Authority.

(Continued)

*Primary Examiner* — Ruth Ilan
*Assistant Examiner* — Matthew D Lee
(74) *Attorney, Agent, or Firm* — Birch, Stewart, Kolasch & Birch, LLP

(57) ABSTRACT

In an impact-absorbing member which extends in a vehicle length direction of an automobile and whose both end portions in the vehicle length direction have a collision-side end portion and a non-collision-side end portion whose positions become mutually different when seen from the vehicle length direction, an outer member and an inner member of the impact-absorbing member are formed so that a position of a gravity center at the collision-side end portion and a position of a gravity center at the non-collision-side end portion become mutually different according to a positional relationship between the collision-side end portion and the non-collision-side end portion in order to suppress a tensile stress generated at the collision-side end portion and suppress a compressive stress generated at the non-collision-side end portion in a collision.

11 Claims, 27 Drawing Sheets

(56) References Cited

FOREIGN PATENT DOCUMENTS

| JP | 2000 289646 A | 10/2000 |
| JP | 2009-227104 A | 10/2009 |
| JP | 2014-40209 A | 3/2014 |
| WO | WO 2012/026028 A1 | 3/2012 |

OTHER PUBLICATIONS

International Search Report for PCT/JP2017/013566 (PCT/ISA/210) dated Apr. 25, 2017.
Written Opinion of the International Searching Authority for PCT/JP2017/013566 (PCT/ISA/237) dated Apr. 25, 2017.

\* cited by examiner

IMPACT-ABSORBING MEMBER AND SIDE MEMBER OF AUTOMOBILE

TECHNICAL FIELD

The present invention relates to an impact-absorbing member of an automobile such as a passenger vehicle or a truck. Concretely, the present invention relates to an impact-absorbing member for absorbing energy in an automobile collision.

BACKGROUND ART

A monocoque structure is the mainstream of a vehicle body of an automobile. The monocoque structure is normally configured such that a steel sheet is press-formed into a component having a flange, which is called a hat component, flange portions are then assembled together into a box shape through spot welding or the like, and those plurality of box-shaped components are mutually joined. Among those structural members, structural members such as side members and a side sill as illustrated in FIG. 1 are required to have performance of absorbing impact in a collision, which is so-called impact-absorbing performance.

For example, side members of an automobile include front side members for absorbing impact in a front-end collision, and rear side members for absorbing impact in a rear-end collision. As illustrated in FIG. 2 (perspective view) and FIG. 3 (plan view), front side members include one which is attached to a right side of a vehicle and one which is attached to a left side of a vehicle. Further, the front side member is configured in a manner that a front part of the front side member having an impact-absorbing member and a rear part of the front side member which is connected to a cabin side and which has a curved portion, are mutually joined. The front part of the front side member has an impact-absorbing function for absorbing impact in a front-end collision, and the rear part of the front side member has a deformation suppressing function with which a deformation is difficult to occur in a collision.

Further, as illustrated in FIG. 4 (perspective view), rear side members also include one which is attached to a right side of a vehicle and one which is attached to a left side of a vehicle. The rear side member is configured in a manner that a rear part of the rear side member having an impact-absorbing member and a front part of the rear side member which is connected to a cabin side and which has a curved portion, are mutually joined. The front part of the rear side member has a deformation suppressing function with which a deformation is difficult to occur in a collision, and the rear part of the rear side member has an impact-absorbing function for absorbing impact in a rear-end collision.

Here, the "impact-absorbing member" in the present description indicates a member which absorbs (alleviates) impact when being buckled and subjected to large plastic deformation (for example, axial collapse deformation or bending deformation) due to a compressive force in a collision. The impact-absorbing member is subjected to large plastic deformation in a collision, so that it is disposed on at least either a vehicle outer side in a vehicle length direction or a vehicle outer side in a vehicle width direction with respect to a place occupied by a passenger, from a viewpoint of securing a space for the passenger in the collision. In a case of each of front side members exemplified in FIG. 5 (plan view), a part in front of a front sub-frame to be an attaching portion of a front suspension component, namely, a straight portion on a vehicle outer side in a vehicle length direction L, is the impact-absorbing member. Meanwhile, in a case of a rear side member exemplified in FIG. 6 (side view), a part behind a rear sub-frame to be an attaching portion of a rear suspension component, namely, a straight portion positioned on a vehicle outer side in the vehicle length direction L, is the impact-absorbing member. Further, when a side member has a bent portion, a straight portion which is positioned on the vehicle outer side in the vehicle length direction relative to the bent portion, is the impact-absorbing member. Note that a shape of the "straight portion" is not limited to a strictly straight shape with no bent portion in the vehicle length direction L, but includes a substantially straight shape. Further, the "impact-absorbing member" in the present description does not include a crash-box which is sometimes provided to a front end portion of a front side member or a rear end portion of a rear side member.

In order to improve safety in an automobile collision, it is required to increase impact-absorbing performance of such an impact-absorbing member. Patent Documents 1 to 3 describe conventional impact-absorbing members.

Patent Document 1 discloses a technique in which a plurality of beads are arranged on each of an outer panel and an inner panel that form a front side member of an automobile, the beads on the outer panel and the beads on the inner panel being displaced by a half pitch. Since such beads are provided, when an impact load is applied, a bellows-like axial collapse deformation occurs from each of those plurality of beads which is set as a starting point. Patent Document 1 improves impact-absorbing performance with the above-described configuration.

Patent Document 2 discloses a technique in which, in a chassis offset frame for a truck, there is provided a stress-concentration assisting means at a portion on an opposite side in a vertical direction of a stress-concentrated portion to be a break starting point when an impact load is applied, in order to increase impact-absorbing performance. In Patent Document 2, by providing such a stress-concentration assisting means, a stress value in the vicinity of the break starting point is set to be substantially constant, to thereby suppress a break in a Z-shape. In Patent Document 2, a bellows-like axial collapse deformation is made to occur between the break starting points because of the above-described configuration, thereby improving the impact-absorbing performance.

Patent Document 3 discloses a side member formed of a front member which extends in a vehicle length direction, a middle member which extends rearward by being bent from a rear end portion of the front member, and a rear member which extends rearward from a rear end portion of the middle member. In Patent Document 3, impact in a collision is absorbed with the use of this side member. Note that a vehicle structure to which the side member of Patent Document 3 is attached is a vehicle structure of a so-called cab-over type in which a part of a floor panel bulges upward, an engine is housed in an inner space provided by the bulged floor panel, and a passenger seat is arranged above the engine. In a case of such a vehicle structure, if, out of the front member, the middle member, and the rear member that form the side member, the middle member is subjected to large plastic deformation as an impact-absorbing member, a part below the passenger seat is deformed, which causes a problem regarding securement of a space for a passenger. For this reason, the impact-absorbing member of the side member described in Patent Document 3 is the front member.

PRIOR ART DOCUMENT

Patent Document

Patent Document 1: Japanese Laid-open Patent Publication No. H5-105110
Patent Document 2: Japanese Laid-open Patent Publication No. 2000-289646
Patent Document 3: Japanese Laid-open Patent Publication No. 2014-40209

SUMMARY OF THE INVENTION

Problems to be Solved by the Invention

An impact-absorbing member is shaped in accordance with a shape of a vehicle body, and among impact-absorbing members which extend in a vehicle length direction such as side members, there is one in which a position of a collision-side end portion and a position of a non-collision-side end portion are mutually different when seen from a vehicle length direction. Note that "the collision-side end portion" in the present description indicates, out of both end portions of an impact-absorbing member which extends in a vehicle length direction, an end portion which is positioned on a vehicle outer side in the vehicle length direction in a relative manner, and "the non-collision-side end portion" indicates an end portion which is positioned on a vehicle inner side in the vehicle length direction in a relative manner. For example, "the collision-side end portion" when the impact-absorbing member is used as a front side member, is an end portion on a front side in the vehicle length direction. Further, "the collision-side end portion" when the impact-absorbing member is used as a rear side member, is an end portion on a rear side in the vehicle length direction. Further, "the position of the collision-side end portion" in the present description indicates a position of a gravity center (center of figure) at the collision-side end portion when seen from a vehicle length direction L. Further, "the position of the non-collision-side end portion" indicates a position of a gravity center (center of figure) at the non-collision-side end portion when seen from the vehicle length direction L.

FIG. 7 is a plan view illustrating an impact-absorbing member of a front side member (left side) having a shape as illustrated in FIG. 5. In an example illustrated in FIG. 7, a collision-side end portion E is offset by a displacement $W_0$ on a vehicle outer side in a vehicle width direction W relative to a non-collision-side end portion E'. This impact-absorbing member 51 includes an outer member 52 and an inner member 53 having a hat channel shape. As illustrated in FIG. 8 to FIG. 10, the outer member 52 and the inner member 53 have the same cross-sectional shape from the collision-side end portion E to the non-collision-side end portion E', and they also have equal length in the vehicle width direction W and equal length in a vertical direction V at each cross section.

In a case of such an impact-absorbing member 51, when an impact load is input into the collision-side end portion E from a front side in the vehicle length direction L at a time of front-end collision, not only an axial compressive force but also a bending moment M such as one that bends the impact-absorbing member 51 toward the vehicle outer side in the vehicle width direction W is generated at the impact-absorbing member 51. Due to this bending moment M, a compressive stress along the vehicle length direction L is generated at a portion on the vehicle outer side in the vehicle width direction W of the impact-absorbing member 51, as illustrated in FIG. 11. Further, due to the bending moment M, a tensile stress along the vehicle length direction L is generated at a portion on the vehicle inner side in the vehicle width direction W of the impact-absorbing member 51. The bending moment M at the non-collision-side end portion E' becomes higher than that at the collision-side end portion E. Specifically, there is created a situation where a high compressive stress is generated and a bending deformation is induced at the portion on the vehicle outer side in the vehicle width direction W of the non-collision-side end portion E' of the impact-absorbing member 51. Besides, the tensile stress in the vehicle length direction L is generated at the portion on the vehicle inner side in the vehicle width direction W of the impact-absorbing member 51, which creates a situation where the vehicle inner side in the vehicle width direction W is difficult to be subjected to a buckling deformation. Specifically, the impact-absorbing member 51 as illustrated in FIG. 7 is easily subjected to a bending deformation when an impact load is input therein, and since a stable axial collapse deformation is difficult to occur, it has not been able to sufficiently improve impact-absorbing performance.

However, the technique disclosed in Patent Document 1 is one aimed at the impact-absorbing member in which the positions of the collision-side end portion and the non-collision-side end portion in the vehicle width direction are the same. For this reason, if the technique in Patent Document 1 is applied to the impact-absorbing member having a shape as illustrated in FIG. 7, the deformation in a bending mode occurs at the non-collision-side end portion at an initial stage of collision from a front side, resulting in that it may be impossible to obtain aimed impact-absorbing performance as the impact-absorbing member.

Meanwhile, the technique disclosed in Patent Document 2 can be applied to the impact-absorbing member in which the positions of the collision-side end portion and the non-collision-side end portion are mutually different when seen from the vehicle length direction. However, the technique in Patent Document 2 is a technique in which the bellows-like axial collapse deformation is made to occur between the break starting points, so that a case capable of obtaining an effect of improving the impact-absorbing performance is limited to one where there are plural break starting points.

Further, even if the front member being the impact-absorbing member in Patent Document 3 is applied as the impact-absorbing member having a shape as illustrated in FIG. 7, when the impact load is input, a high compressive stress is generated and the bending deformation is induced at the portion on the vehicle outer side in the vehicle width direction of the front member. Besides, the tensile stress in the vehicle length direction is generated at the portion on the vehicle inner side in the vehicle width direction of the front member, which creates a situation where the vehicle inner side in the vehicle width direction is difficult to be subjected to the buckling deformation. For this reason, it is not possible to sufficiently improve the impact-absorbing performance.

The present invention has been made in view of such problems of the conventional techniques, and an object thereof is as follows. In (a) an impact-absorbing member having a shape extending in a vehicle length direction and in which positions of a collision-side end portion and a non-collision-side end portion (for example, positions in a vehicle width direction or positions in a vertical direction) are mutually different when seen from the vehicle length direction, (b) a deformation in a bending mode at the non-collision-side end portion is suppressed, and (c) a deformation in a bellows-like axial collapse mode at the collision-side end portion is made to occur in a stable manner.

Means for Solving the Problems

As a result of earnest studies for solving the above-described problems, the present inventors obtained the following findings. That is, the present invention which solves the above-described problems is characterized in that it is an impact-absorbing member which extends in a vehicle length direction of an automobile and whose both end portions in the vehicle length direction are offset so that positions of the both end portions become mutually different when seen from the vehicle length direction, the impact-absorbing member including a hat-shaped outer member and a hat-shaped inner member which are mutually joined at flange portions, in which, when a ratio between a length $G_{in}$, which is the length in an offset direction from a gravity center of a cross section of the outer member and the inner member perpendicular to the vehicle length direction to a top portion of the inner member, and a length $G_{out}$, which is the length in the offset direction from the gravity center of the cross section to a top portion of the outer member, $(G_{in}/G_{out})$ is defined as a ratio of gravity centers, the ratio of gravity centers increases from a side of the end portion, selected from the both end portions, whose position is offset toward a vehicle outer side when seen from the vehicle length direction, toward another side of the end portion, whose position is offset toward a vehicle inner side when seen from the vehicle length direction.

The present invention according to another point of view is characterized in that it is an impact-absorbing member which extends in a vehicle length direction of an automobile and whose both end portions in the vehicle length direction are offset so that positions of the both end portions become mutually different when seen from the vehicle length direction, the impact-absorbing member including a hat-shaped outer member and a hat-shaped inner member which are mutually joined at flange portions, in which, when a ratio between a hat height $H_{in}$ of the inner member and a hat height $H_{out}$ of the outer member in a cross section perpendicular to the vehicle length direction of the outer member and the inner member $(H_{in}/H_{out})$ is defined as a ratio of hat heights, the ratio of hat heights increases from a side of the end portion, out of the both end portions, whose position is offset toward a vehicle outer side when seen from the vehicle length direction, toward another side of the end portion, whose position is offset toward a vehicle inner side when seen from the vehicle length direction.

Further, the present invention according to another point of view is characterized in that it is a side member of an automobile including a member having the above-described impact-absorbing member, and a deformation suppressing member which is connected to a cabin side and which has a curved portion.

Effect Of the Invention

According to the present invention, it becomes possible to improve impact-absorbing performance of an impact-absorbing member.

MODES FOR CARRYING OUT INVENTION

Figure 1:
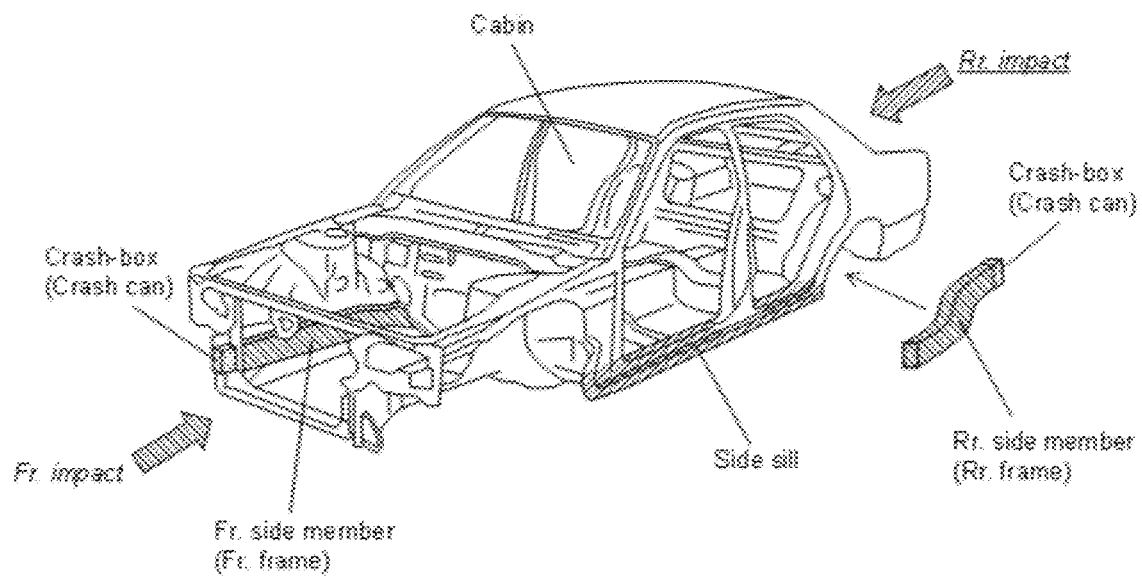
FIG. 1 is a perspective view illustrating one example of a vehicle structure of an automobile.

Hereinafter, embodiments of the present invention will be described while referring to the drawings. Note that in the present description and the drawings, components having substantially the same functional configurations are denoted by the same reference numerals to omit overlapped explanation.

First Embodiment

Figure 3:
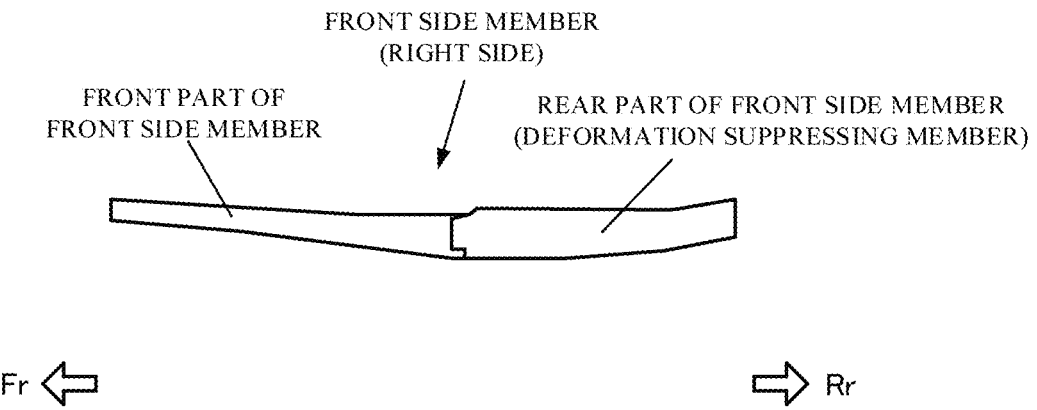
FIG. 3 is a plan view illustrating one example of a shape of the front side members.
Figure 3:
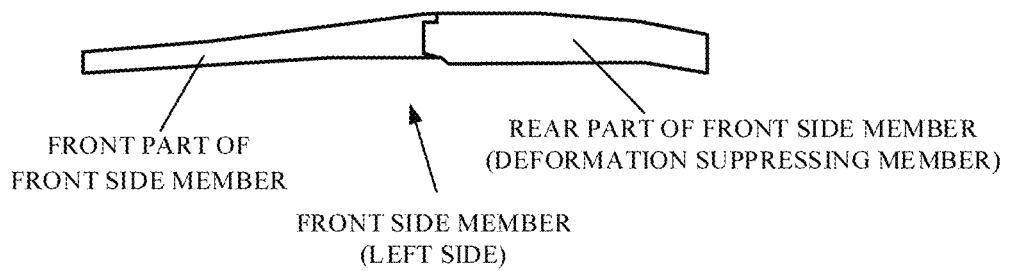
Figure 12:
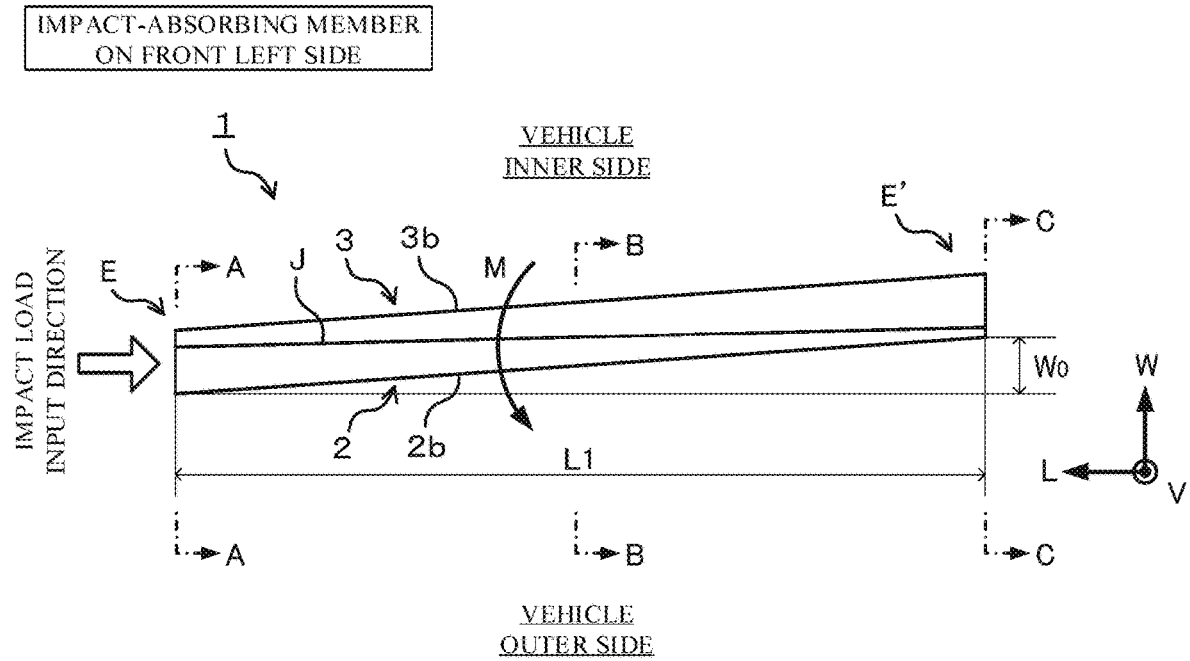
FIG. 12 is a plan view illustrating a schematic shape of an impact-absorbing member (front left side) according to a first embodiment of the present invention.

An impact-absorbing member exemplified in a first embodiment is an impact-absorbing member of a front side member (left side) having a shape as illustrated in FIG. 3. As illustrated in FIG. 12, an impact-absorbing member 1 in the first embodiment has a shape in which a collision-side end portion E is offset by a displacement $W_0$ on a vehicle outer side in a vehicle width direction W relative to a non-collision-side end portion E'. Note that FIG. 12 exemplifies the impact-absorbing member 1 on the front left side, but, as an impact-absorbing member on a front right side, one with a shape of the impact-absorbing member 1 on the front left side which is laterally inverted when seen from a vehicle length direction L, for example, is applied.

Figure 13:
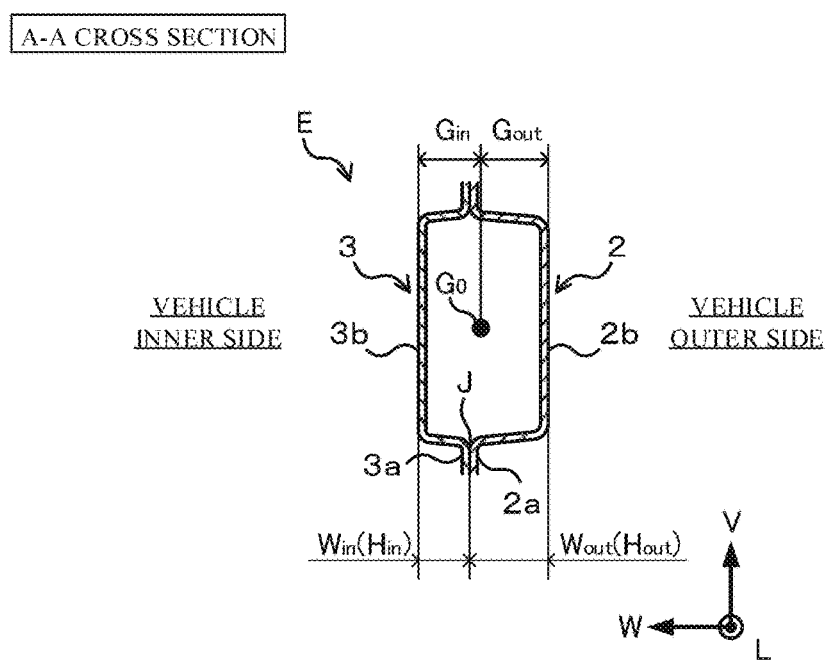
FIG. 13 is a sectional view taken along A-A in FIG. 12.
Figure 14:
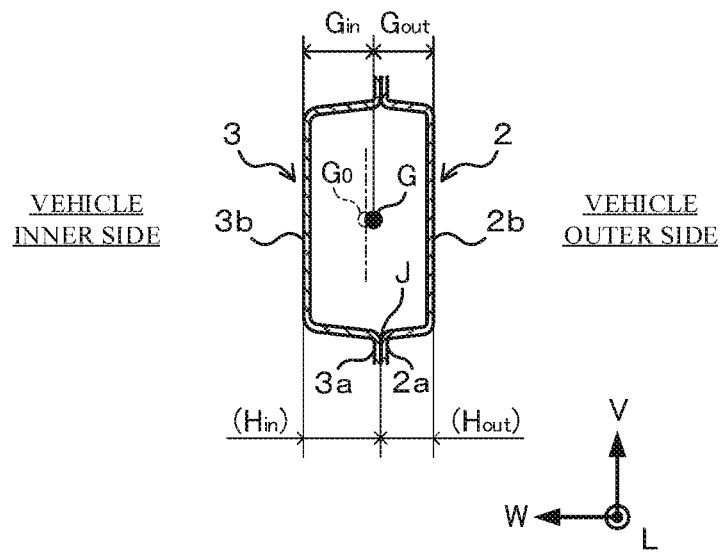
FIG. 14 is a sectional view taken along B-B in FIG. 12.
Figure 15:
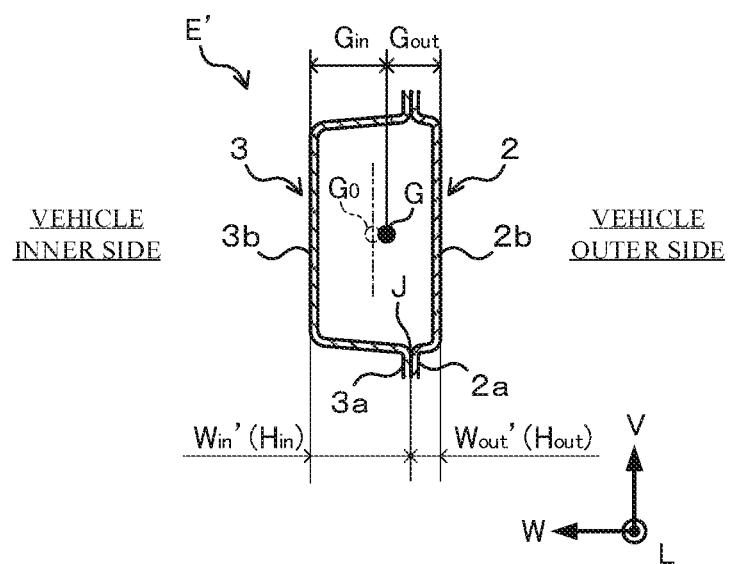
FIG. 15 is a sectional view taken along C-C in FIG. 12.

The impact-absorbing member 1 is formed of an outer member 2 and an inner member 3. As illustrated in FIG. 13 to FIG. 15, a cross section perpendicular to the vehicle length direction L of each of the outer member 2 and the inner member 3 has a so-called hat shape, and flange portions 2a, 3a projecting in a vertical direction V are formed on the outer member 2 and the inner member 3. Surfaces of the flange portions 2a, 3a of the outer member 2 and the inner member 3 are put together to join the members. Consequently, the impact-absorbing member 1 has a shape of a closed section when seen from the vehicle length direction L. Further, as illustrated in FIG. 12, when seen from a direction in which the flange portions 2a, 3a are projected (the vertical direction V in the first embodiment), the outer member 2 and the inner member 3 are formed so that a joined surface J between the outer member 2 and the inner member 3 has a straight shape. In the explanation hereinbelow, the joined surface between the outer member 2 and the inner member 3 (here, a joined surface between the flange portion 2a and the flange portion 3a) is sometimes simply referred to as a "joined surface J". Note that as a joining method of the flange portion 2a of the outer member 2 and the flange portion 3a of the inner member 3, spot welding is normally employed, but, it is also possible to employ another joining method such as laser welding, arc welding, or seam welding.

As illustrated in FIG. 13, in a cross section of the collision-side end portion E when seen from the vehicle length direction L, a length $W_{out}$ in the vehicle width direction (which is also referred to as a hat height $H_{out}$) from a top portion 2b of the outer member 2 to the joined surface J is longer than a length $W_{in}$ in the vehicle width direction (which is also referred to as a hat height $H_{in}$) from a top portion 3b of the inner member 3 to the joined surface J. As illustrated in FIG. 13 to FIG. 15, the length $W_{out}$ in the vehicle width direction from the top portion 2b of the outer member 2 to the joined surface J decreases from the collision-side end portion E toward the non-collision-side end portion E'. On the other hand, the length $W_{in}$ in the vehicle width direction from the top portion 3b of the inner member 3 to the joined surface J increases from the collision-side end portion E toward the non-collision-side end portion E'. Further, as illustrated in FIG. 15, at the non-collision-side end portion E', a length $W_{out}'$ in the vehicle width direction from the top portion 2b of the outer member 2 to the joined surface J is shorter than a length $W_{in}'$ in the vehicle width direction from the top portion 3b of the inner member 3 to the joined surface J. Note that "the top portion of the outer member" indicates a portion, of the outer member 2, which is farthest from the flange portion 2a in a direction (the vehicle width direction W in the first embodiment, for example) perpendicular to the flange projecting direction (the vertical direction V in the first embodiment, for example) when seen from the vehicle length direction L. In a similar manner, "the top portion of the inner member" indicates a portion, of the inner member 3, which is farthest from the flange portion 3a in the direction perpendicular to the flange projecting direction when seen from the vehicle length direction L.

In a case of an example of the present embodiment, a ratio between the hat height $H_{in}$ of the inner member 3 and the hat height $H_{out}$ of the outer member 2 (referred to as a ratio of hat heights $H_{in}/H_{out}$, hereinafter) gradually increases from the collision-side end portion E toward the non-collision-side end portion E'. A rate of increase of the ratio of hat heights $H_{in}/H_{out}$ with respect to a direction from the collision-side end portion E toward the non-collision-side end portion E' can be arbitrarily set. For example, the sum of the hat heights $H_{in}$ and $H_{out}$ is set to be constant, and the rate of increase of the ratio of hat heights $H_{in}/H_{out}$ is set to be constant. In this case, the shape of flanges (the joined surface J) when seen from the direction in which the flanges are projected becomes straight, and thus it is possible to form the impact-absorbing member 1 with the use of the outer member 2 and the inner member 3 having a simple shape. Note that "the rate of increase of the ratio of hat heights $H_{in}/H_{out}$" is calculated by (B−A)/L1, in which the ratio of hat heights $H_{in}/H_{out}$ at the collision-side end portion E is set to A, the ratio of hat heights $H_{in}/H_{out}$ at the non-collision-side end portion E' is set to B, and a length in the vehicle length direction L of the impact-absorbing member 1 is set to L1. The rate of increase of the ratio of hat heights ($H_{in}/H_{out}$) is preferably 0.033 or more. This enables to improve the impact-absorbing performance of the impact-absorbing member 1.

When the impact-absorbing member 1 having a shape as above is employed, in a cross section perpendicular to the vehicle length direction L, a gravity center G at the non-collision-side end portion E' shifts to a vehicle outer side in the vehicle width direction W relative to a gravity center $G_0$ at the collision-side end portion E, in accordance with a change in the positions of the flange portions 2a, 3a in the impact-absorbing member 1 in the vehicle width direction W. As illustrated in FIG. 13 to FIG. 15, the position of the gravity center G of the impact-absorbing member 1 shifts to the vehicle outer side in the vehicle width direction W from the position of the gravity center $G_0$ at the collision-side end portion E, as it approaches from the collision-side end portion E toward the non-collision-side end portion E'. Note that in FIG. 14 and FIG. 15, the position of the gravity center $G_0$ at the collision-side end portion E illustrated in FIG. 13 is indicated by a dotted line.

Figure 8:
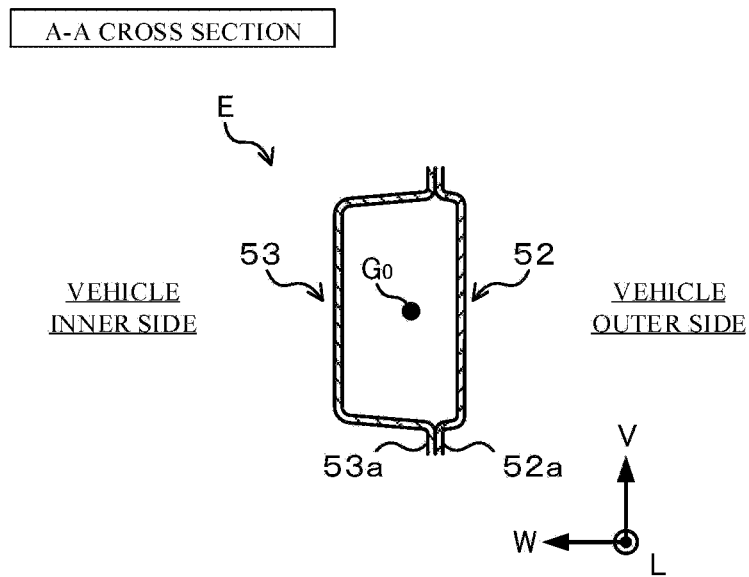
FIG. 8 is a sectional view taken along A-A in FIG. 7.
Figure 9:
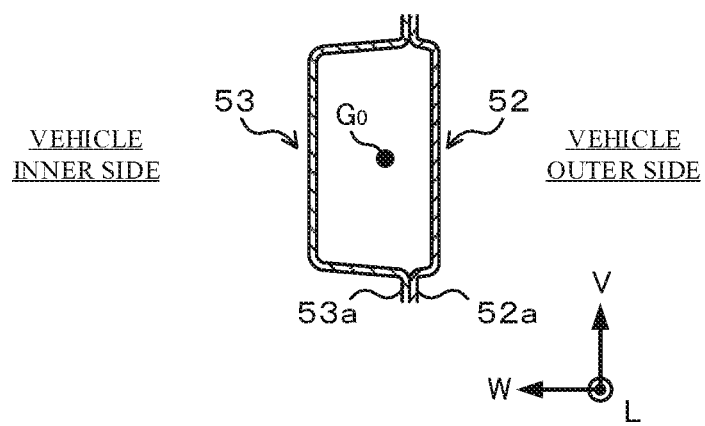
FIG. 9 is a sectional view taken along B-B in FIG. 7.
Figure 10:
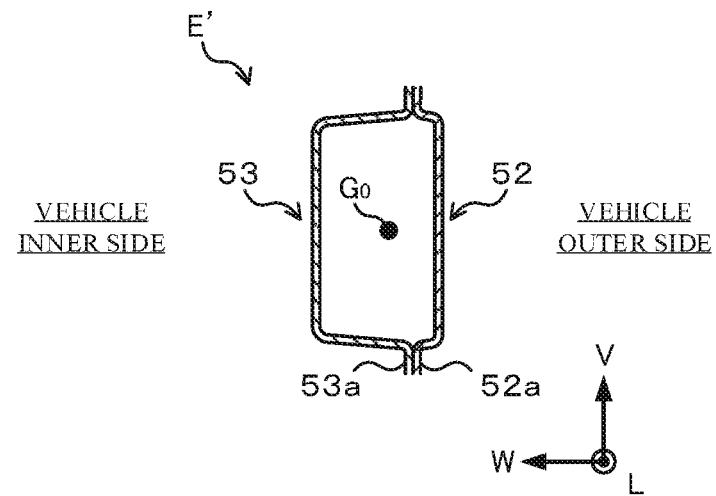
FIG. 10 is a sectional view taken along C-C in FIG. 7.
Figure 11:
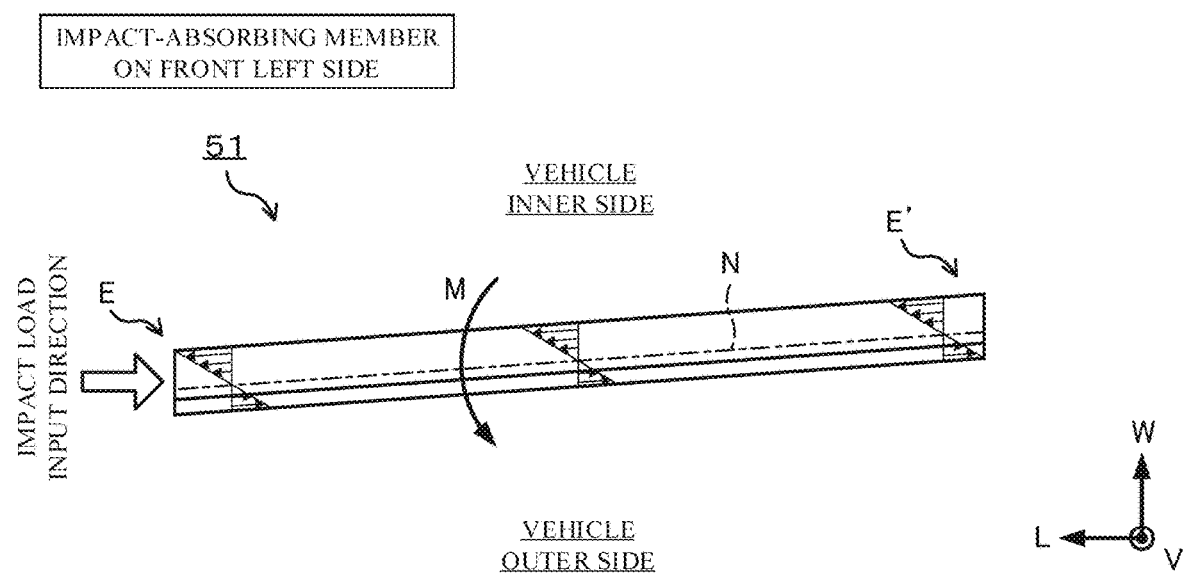
FIG. 11 is a view illustrating a stress distribution chart when an impact load is input in a conventional impact-absorbing member (front left side).
Figure 16:
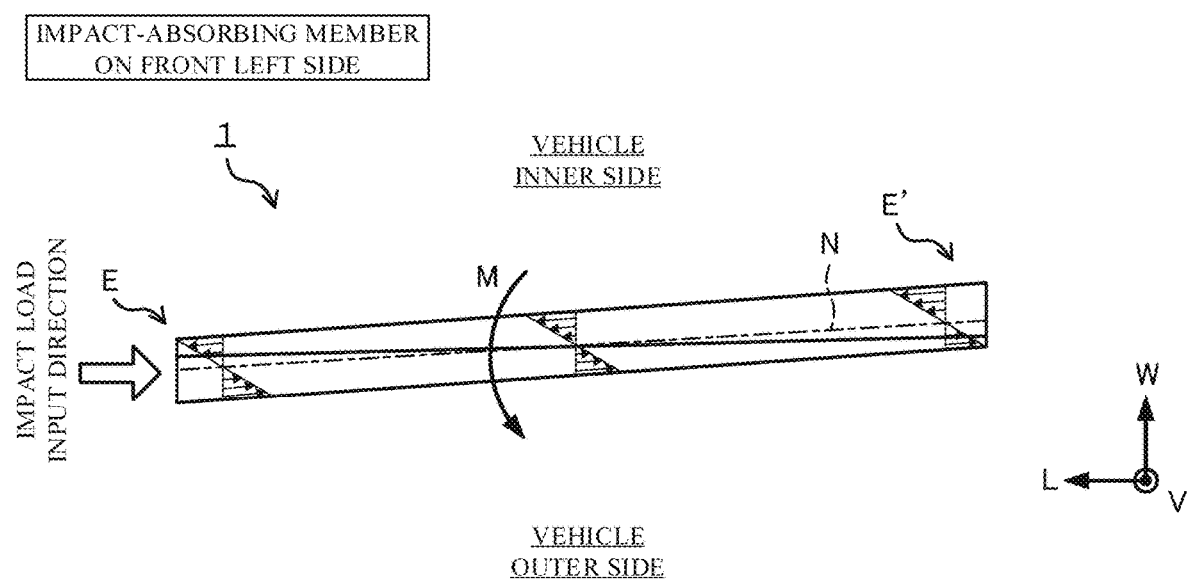
FIG. 16 is a view illustrating a stress distribution chart when an impact load is input in the impact-absorbing member (front left side) according to the first embodiment of the present invention.
Figure 17:
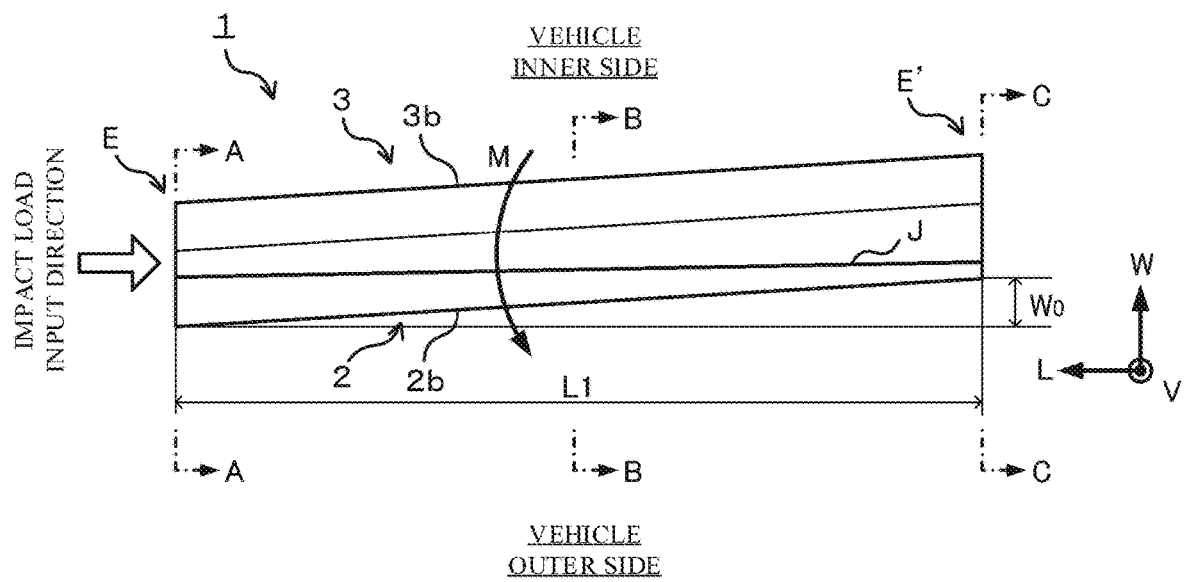
FIG. 17 is a plan view illustrating a schematic shape of an impact-absorbing member (front left side) according to a second embodiment of the present invention.

In the impact-absorbing member 1 of the first embodiment, a bending moment M in a counterclockwise direction when seen from a vehicle inner side in the vertical direction V as illustrated in FIG. 12 is generated in a front-end collision. Meanwhile, the impact-absorbing member 1 of the first embodiment has a shape such that the position of the gravity center shifts to the vehicle outer side in the vehicle width direction W from the collision-side end portion E toward the non-collision-side end portion E', as described above. Accordingly, when it is assumed that the bending moment M is constant along the vehicle length direction L, a tensile stress on the vehicle inner side in the vehicle width direction W of the impact-absorbing member 1 generated at the collision-side end portion E due to the bending moment M becomes smaller than a tensile stress generated at the non-collision-side end portion E', as in a stress distribution chart illustrated in FIG. 16. Specifically, the tensile stress on the vehicle inner side in the vehicle width direction W of the impact-absorbing member 1 at the collision-side end portion E becomes small when compared to the conventional impact-absorbing member 51 as illustrated in FIG. 8 to FIG. 10 in which the position of the gravity center in the cross section perpendicular to the vehicle length direction L does not change from the collision-side end portion E toward the non-collision-side end portion E', and which has the stress distribution as illustrated in FIG. 11. Consequently, the situation where the vehicle inner side in the vehicle width direction W of the collision-side end portion E is difficult to be buckled is improved, resulting in that the axial collapse deformation becomes likely to be induced. Besides, a compressive stress on the vehicle outer side in the vehicle width direction W of the impact-absorbing member 1 generated at the non-collision-side end portion E' due to the bending moment M becomes smaller than a compressive stress generated at the collision-side end portion E. Accordingly, the vehicle outer side in the vehicle width direction W of the impact-absorbing member 1 at the non-collision-side end portion E' is in a situation where it is more difficult to be compressed than the vehicle outer side in the vehicle width direction W of the conventional impact-absorbing member 51 at the non-collision-side end portion E', resulting in that the bending deformation at the non-collision-side end portion E' is likely to be suppressed. Note that a dashed line in FIG. 16 indicates a neutral axis N connecting gravity centers of cross sections perpendicular to the vehicle length direction L from the collision-side end portion E to the non-collision-side end portion E'.

As described above, in a case where the collision-side end portion E of the impact-absorbing member 1 is positioned on the vehicle outer side in the offset direction (the vehicle width direction W in the first embodiment) relative to the non-collision-side end portion E', when the impact-absorbing member 1 with a configuration such that the position of the gravity center in the cross section perpendicular to the vehicle length direction L shifts to the vehicle outer side in the vehicle width direction W from the collision-side end portion E toward the non-collision-side end portion E' as in the first embodiment is employed, it is possible to stably cause the axial collapse deformation at the collision-side end portion E, and suppress the bending deformation at the non-collision-side end portion E'. In other words, by reducing a difference between the tensile stress on the vehicle inner side in the vehicle width direction W of the impact-absorbing member 1 at the collision-side end portion E and the compressive stress on the vehicle outer side in the vehicle width direction W of the impact-absorbing member 1 at the non-collision-side end portion E', it is possible to stably cause the axial collapse deformation at the collision-side end portion E and suppress the bending deformation at the non-collision-side end portion E'.

Note that when the collision-side end portion E is positioned on the vehicle outer side in the vehicle width direction W relative to the non-collision-side end portion E', the length $W_{out}$ in the vehicle width direction from the top portion 2b of the outer member 2 to the joined surface J at the collision-side end portion E and the length $W_{out}'$ in the vehicle width direction from the top portion 2b of the outer member 2 to the joined surface J at the non-collision-side end portion E' preferably satisfy $W_{out} \geq W_{out}' \times 2.8$. Consequently, it is possible to sufficiently reduce the difference between the tensile stress in the vehicle length direction L on the vehicle inner side in the vehicle width direction W at the collision-side end portion E and the compressive stress in the vehicle length direction L on the vehicle outer side in the vehicle width direction W at the non-collision-side end portion E', and the impact-absorbing performance can be improved when compared to a case of $W_{out} < W_{out}' \times 2.8$. Further, a more preferable relationship between $W_{out}$ and $W_{out}'$ is $W_{out} \geq W_{out}' \times 3$.

Further, $W_{out}'$ preferably satisfies $W_{out}' \geq 8$ mm. This makes it possible to increase the flexural rigidity and the strength of the outer member 2. As a result of this, it is possible to suppress the bending deformation at the non-collision-side end portion E' when compared to a case of $W_{out}' < 8$ mm, and the impact-absorbing performance can be improved. A more preferable range of $W_{out}'$ is $W_{out}' \geq 10$ mm.

Besides, the impact-absorbing member 1 satisfying $W_{out} \geq W_{out}' \times 3$ and satisfying $W_{out}' \geq 10$ mm can further improve the impact-absorbing performance.

Further, from a viewpoint of improvement of the impact-absorbing performance, it is preferable that the length L1 in the vehicle length direction L of the impact-absorbing member 1 is in a range of 300 mm $\leq$ L1 $\leq$ 650 mm, and the ratio between the offset amount $W_0$ in the vehicle width direction W between the collision-side end portion E and the non-collision-side end portion E' and L1 satisfies $0.017 \leq W_0/L1 \leq 0.087$. In a range of L1<300 mm or $W_0/L1<0.017$, the effect of suppressing the moment of bending the non-collision-side end portion E' is small, and thus the effect of suppressing the bending deformation at the non-collisionside end portion E' is small. Further, in a range of 650 mm<L1 or 0.087<$W_0$/L1, the moment of bending the collision-side end portion E is excessive, resulting in that the effect of suppressing the bending deformation becomes small. Note that a more preferable numerical range of the length L1 in the vehicle length direction L of the impact-absorbing member 1 is 400 mm≤L1≤600 mm. Further, a more preferable numerical range of the ratio between the offset amount $W_0$ in the vehicle width direction W between the collision-side end portion E and the non-collision-side end portion E' and L1 is 0.035≤$W_0$/L1≤0.070.

Second Embodiment

An impact-absorbing member in a second embodiment is also an impact-absorbing member of a front side member (left side), similarly to the first embodiment. Further, as illustrated in FIG. 17 to FIG. 20, an impact-absorbing member 1 in the second embodiment is similar to the first embodiment in a point that a collision-side end portion E is offset by a displacement $W_0$ on a vehicle outer side in a vehicle width direction W relative to a non-collision-side end portion E'. On the other hand, in the second embodiment, a shape of the impact-absorbing member 1 is different from that of the first embodiment. To put it concretely, the inner member 3 in the first embodiment illustrated in FIG. 12 to FIG. 15 has the hat shape such that the flange portion 3a is formed on the member having the rectangular cross section, but in the second embodiment, an inner member 3 has a hat shape such that a flange portion 3a is formed on a member having a polygonal cross section.

Figure 18:
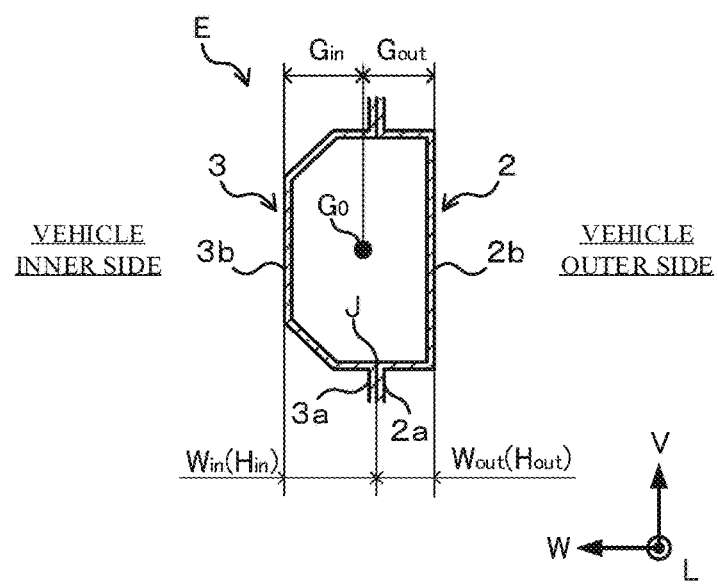
FIG. 18 is a sectional view taken along A-A in FIG. 17.
Figure 19:
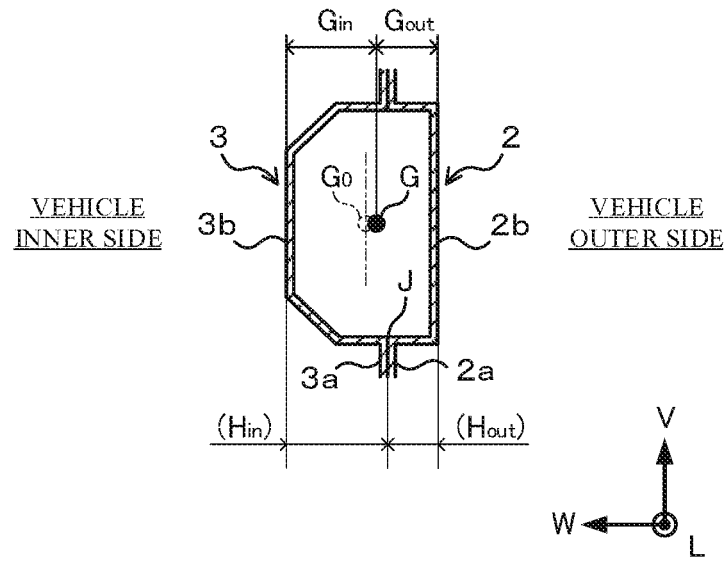
FIG. 19 is a sectional view taken along B-B in FIG. 17.
Figure 20:
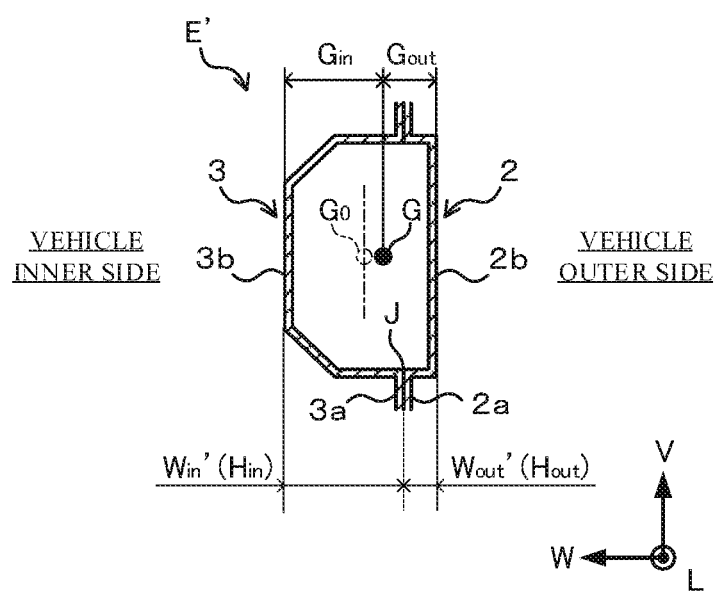
FIG. 20 is a sectional view taken along C-C in FIG. 17.

As illustrated in FIG. 18 to FIG. 20, also in the impact-absorbing member 1 in the second embodiment, a length in the vehicle width direction of an outer member 2 decreases and a length in the vehicle width direction of the inner member 3 increases from the collision-side end portion E toward the non-collision-side end portion E', similarly to the first embodiment.

For this reason, also in the case of the impact-absorbing member 1 in the second embodiment, a gravity center at the non-collision-side end portion E' shifts to the vehicle outer side in the vehicle width direction W relative to a gravity center at the collision-side end portion E, in accordance with a change in positions of the flange portions 2a, 3a in the impact-absorbing member 1 in the vehicle width direction W. Accordingly, as illustrated in FIG. 18 to FIG. 20 as well, a position of a gravity center G of the impact-absorbing member 1 shifts to the vehicle outer side in the vehicle width direction W from a position of a gravity center $G_0$ at the collision-side end portion E, as it approaches from the collision-side end portion E toward the non-collision-side end portion E'. Note that in FIG. 19 and FIG. 20, the position of the gravity center $G_0$ at the collision-side end portion E illustrated in FIG. 18 is indicated by a dotted line.

Figure 21:
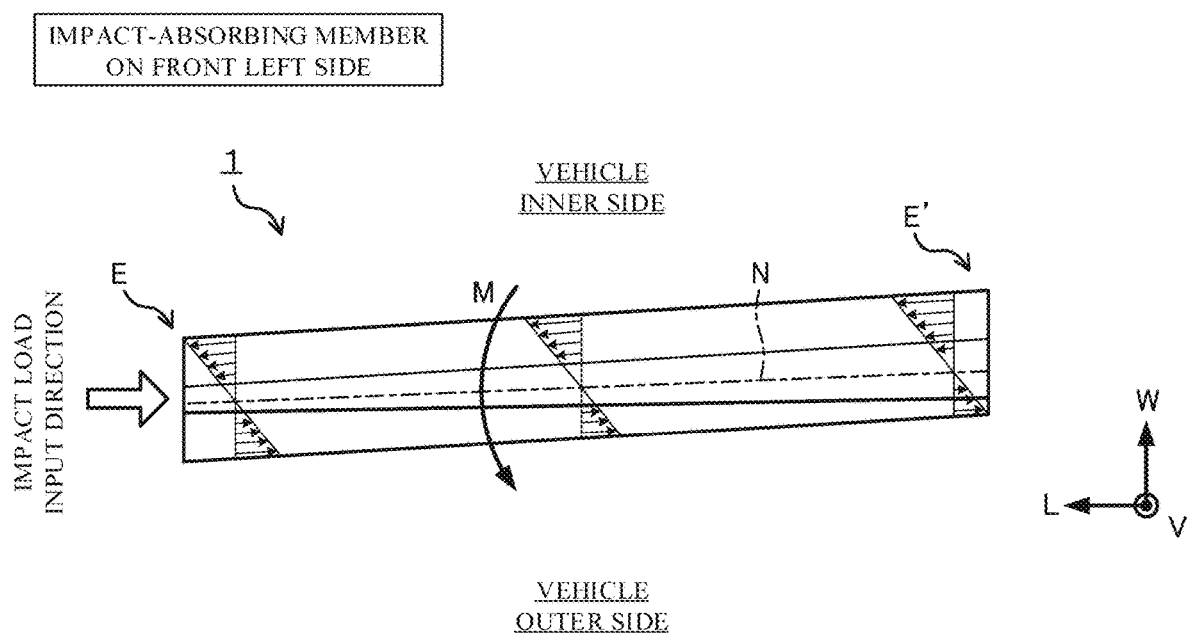
FIG. 21 is a view illustrating a stress distribution chart when an impact load is input in the impact-absorbing member (front left side) according to the second embodiment of the present invention.

Since the gravity center at the collision-side end portion E and the gravity center at the non-collision-side end portion E' satisfy such a positional relationship, when it is assumed that the bending moment M is constant along the vehicle length direction L, a tensile stress on the vehicle inner side in the vehicle width direction W generated at the collision-side end portion E due to the bending moment M becomes smaller than a tensile stress generated at the non-collision-side end portion E', as in a stress distribution chart illustrated in FIG. 21. Further, a compressive stress on the vehicle outer side in the vehicle width direction W generated at the non-collision-side end portion E' due to the bending moment M becomes smaller than a compressive stress generated at the collision-side end portion E. Therefore, the impact-absorbing member 1 in the second embodiment can also stably cause the axial collapse deformation at the collision-side end portion E while suppressing the bending deformation at the non-collision-side end portion E', similarly to the first embodiment. This makes it possible to increase the impact-absorbing performance. Note that a dashed line in FIG. 21 indicates a neutral axis N connecting gravity centers of cross sections perpendicular to the vehicle length direction L from the collision-side end portion E to the non-collision-side end portion E'.

As described above, in a case where the collision-side end portion E of the impact-absorbing member 1 is positioned on the vehicle outer side in the offset direction (the vehicle width direction W in the second embodiment) relative to the non-collision-side end portion E', when the impact-absorbing member 1 with a configuration such that the position of the gravity center in the cross section perpendicular to the vehicle length direction L shifts to the vehicle outer side in the vehicle width direction W from the collision-side end portion E toward the non-collision-side end portion E' as in the second embodiment is employed, it is possible to stably cause the axial collapse deformation at the collision-side end portion E, and suppress the bending deformation at the non-collision-side end portion E'. In other words, by reducing a difference between the tensile stress on the vehicle inner side in the vehicle width direction W of the impact-absorbing member 1 at the collision-side end portion E and the compressive stress on the vehicle outer side in the vehicle width direction W of the impact-absorbing member 1 at the non-collision-side end portion E', it is possible to stably cause the axial collapse deformation at the collision-side end portion E and suppress the bending deformation at the non-collision-side end portion E'.

Third Embodiment

Figure 22:
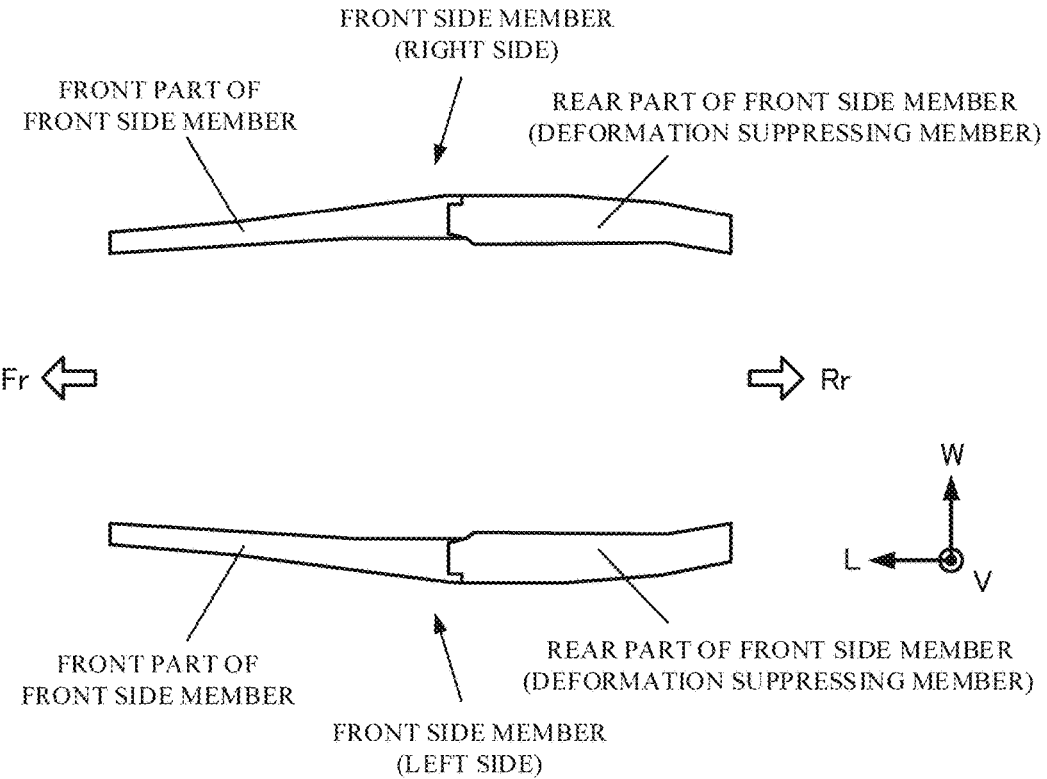
FIG. 22 is a plan view illustrating a schematic shape of front side members according to a third embodiment of the present invention.
Figure 23:
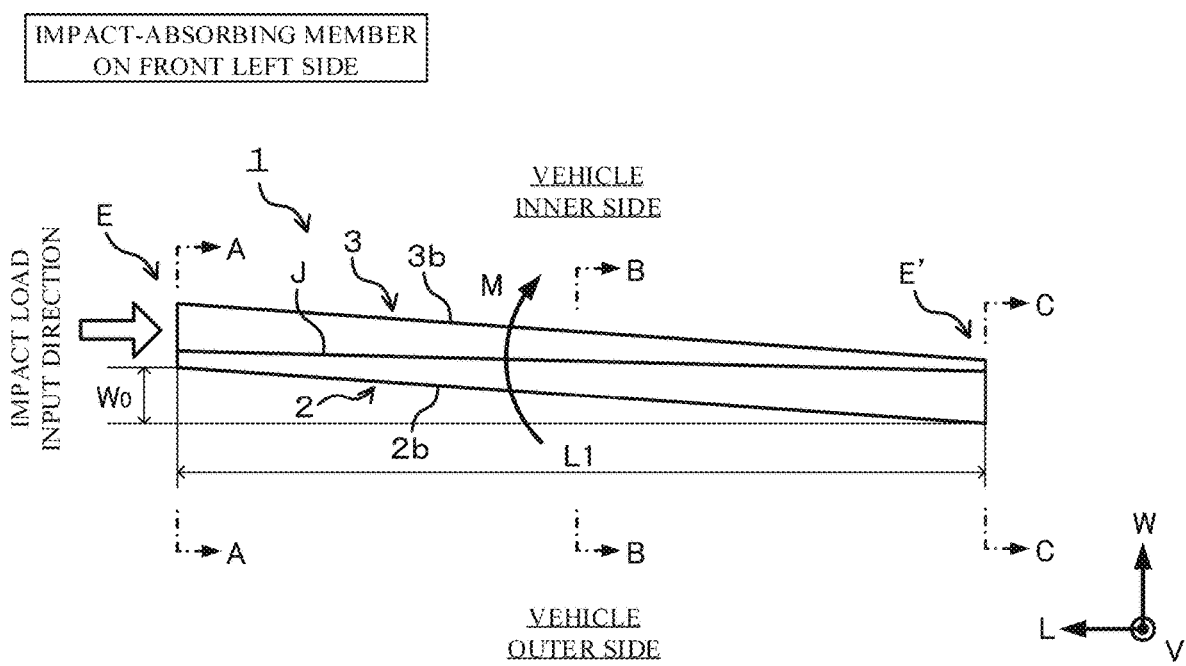
FIG. 23 is a plan view illustrating a schematic shape of an impact-absorbing member (front left side) according to the third embodiment of the present invention.

An impact-absorbing member exemplified in a third embodiment is an impact-absorbing member of a front side member (left side) having a shape as illustrated in FIG. 22. As illustrated in FIG. 23, an impact-absorbing member 1 in the third embodiment has a shape in which a collision-side end portion E is offset by a displacement $W_0$ on a vehicle inner side in a vehicle width direction W relative to a non-collision-side end portion E'. Note that FIG. 23 exemplifies the impact-absorbing member 1 on the front left side, but, as an impact-absorbing member on a front right side, one with a shape of the impact-absorbing member 1 on the front left side which is laterally inverted when seen from a vehicle length direction L, for example, is applied.

Figure 24:
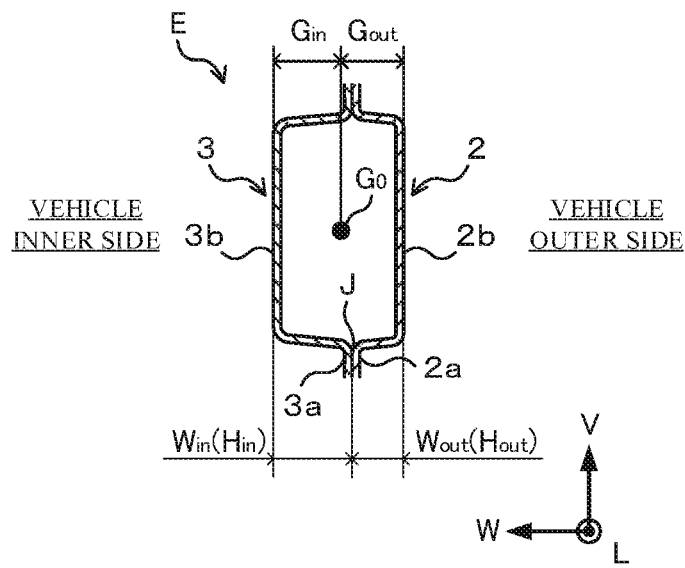
FIG. 24 is a sectional view taken along A-A in FIG. 23.
Figure 25:
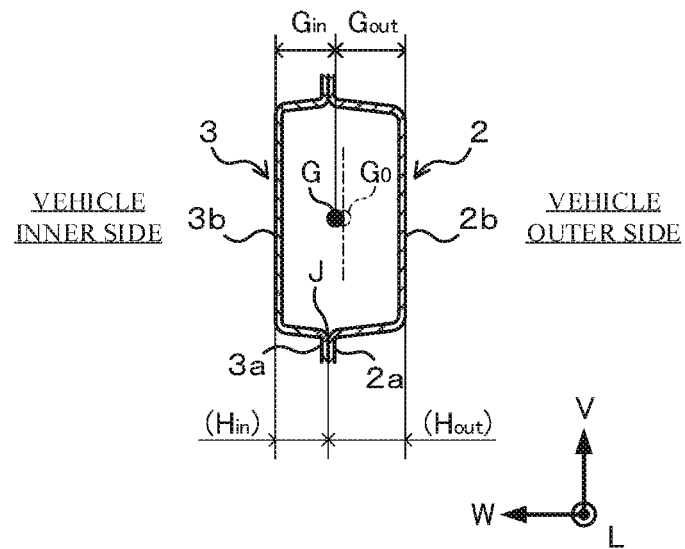
FIG. 25 is a sectional view taken along B-B in FIG. 23.
Figure 26:
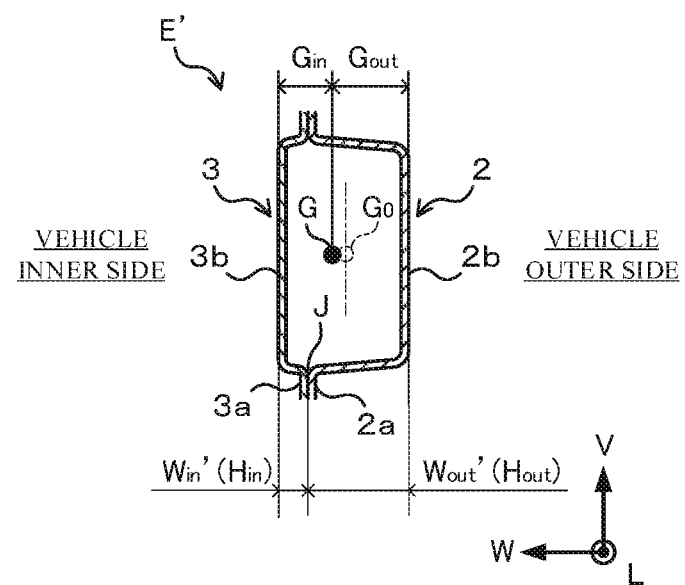
FIG. 26 is a sectional view taken along C-C in FIG. 23.

The impact-absorbing member 1 is formed of an outer member 2 and an inner member 3. As illustrated in FIG. 24 to FIG. 26, a cross section perpendicular to the vehicle length direction L of each of the outer member 2 and the inner member 3 has a so-called hat shape, and flange portions 2a, 3a projecting in a vertical direction V are formed on the outer member 2 and the inner member 3, similarly to the first embodiment. Surfaces of the flange portions 2a, 3a of the outer member 2 and the inner member 3 are put together to join the members. Further, as illustrated in FIG. 23, when seen from a direction in which the flange portions 2a, 3a are projected (the vertical direction V in the second embodiment), the outer member 2 and the inner member 3 are formed so that a joined surface J has a straight shape.

As illustrated in FIG. 24, in a cross section of the collision-side end portion E when seen from the vehicle length direction L, a length $W_{out}$ in the vehicle width direction (which is also referred to as a hat height $H_{out}$) from a top portion 2b of the outer member 2 to the joined surface J is shorter than a length $W_{in}$ in the vehicle width direction (which is also referred to as a hat height $H_{in}$) from a top portion 3b of the inner member 3 to the joined surface J, in the third embodiment. As illustrated in FIG. 24 to FIG. 26, the length in the vehicle width direction from the top portion 2b of the outer member 2 to the joined surface J increases from the collision-side end portion E toward the non-collision-side end portion E'. On the other hand, the length in the vehicle width direction from the top portion 3b of the inner member 3 to the joined surface J decreases from the collision-side end portion E toward the non-collision-side end portion E'. Further, as illustrated in FIG. 26, at the non-collision-side end portion E', a length $W_{out}'$ in the vehicle width direction from the top portion 2b of the outer member 2 to the joined surface J is longer than a length $W_{in}'$ in the vehicle width direction from the top portion 3b of the inner member 3 to the joined surface J.

In the third embodiment, a bending moment M generated in the impact-absorbing member 1 in a front-end collision is a moment in a direction opposite to that of the bending moment M generated in the impact-absorbing member 1 in the first embodiment illustrated in FIG. 12. For this reason, the impact-absorbing member 1 in the third embodiment bends toward the vehicle inner side in the vehicle width direction W, which is different from the first embodiment.

Meanwhile, in the third embodiment, a gravity center at the non-collision-side end portion E' shifts to the vehicle inner side in the vehicle width direction W relative to a gravity center at the collision-side end portion E, in accordance with a change in positions of the flange portions 2a, 3a in the impact-absorbing member 1 in the vehicle width direction W. Accordingly, as illustrated in FIG. 24 to FIG. 26 as well, a position of a gravity center G of the impact-absorbing member 1 shifts to the vehicle inner side in the vehicle width direction W from a position of a gravity center $G_0$ at the collision-side end portion E, as it approaches from the collision-side end portion E toward the non-collision-side end portion E'. Note that in FIG. 25 and FIG. 26, the position of the gravity center $G_0$ at the collision-side end portion E illustrated in FIG. 24 is indicated by a dotted line.

Figure 27:
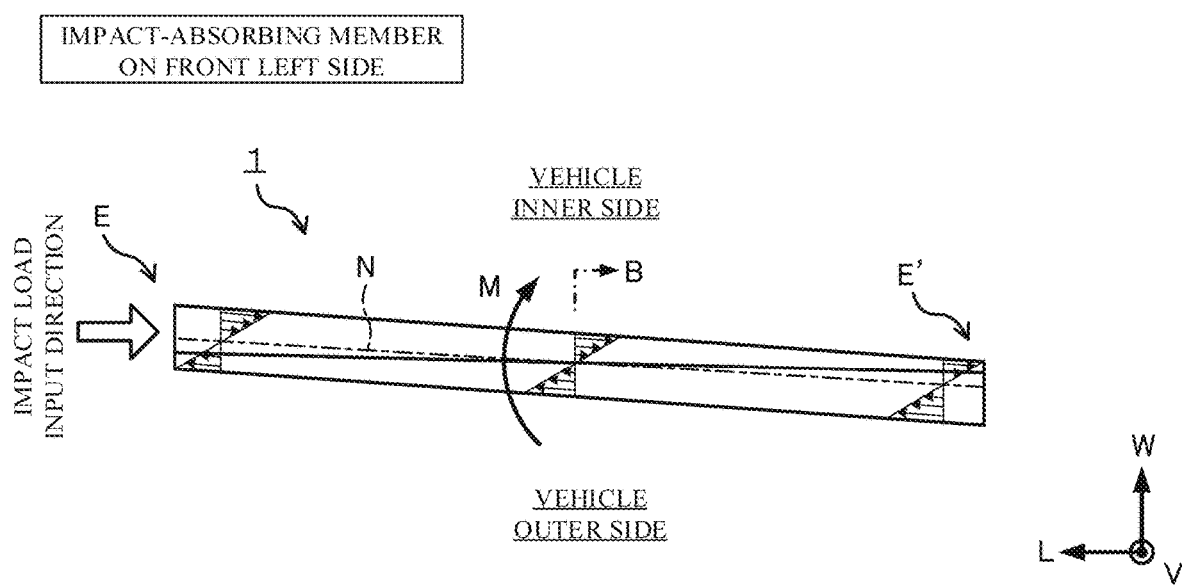
FIG. 27 is a view illustrating a stress distribution chart when an impact load is input in the impact-absorbing member (front left side) according to the third embodiment of the present invention.

Since the gravity center at the collision-side end portion E and the gravity center at the non-collision-side end portion E' satisfy such a positional relationship, when it is assumed that the bending moment M is constant along the vehicle length direction L, a tensile stress generated on the vehicle outer side in the vehicle width direction W at the collision-side end portion E due to the bending moment M becomes smaller than a tensile stress generated at the non-collision-side end portion E', as in a stress distribution chart illustrated in FIG. 27. Further, a compressive stress generated on the vehicle inner side in the vehicle width direction W at the non-collision-side end portion E' due to the bending moment M becomes smaller than a compressive stress generated at the collision-side end portion E.

As a result of this, when compared to the conventional impact-absorbing member as illustrated in FIG. 8 to FIG. 10 in which the position of the gravity center in the cross section perpendicular to the vehicle length direction L does not change from the collision-side end portion E toward the non-collision-side end portion E', and which has the stress distribution as illustrated in FIG. 11, it becomes possible to suppress the induction of the bending deformation at the non-collision-side end portion E' and it is also possible to improve the situation where the vehicle outer side in the vehicle width direction W of the collision-side end portion E is difficult to be buckled. Specifically, in a case where the collision-side end portion E is positioned on the vehicle inner side in the offset direction (the vehicle width direction W in the third embodiment) relative to the non-collision-side end portion E', when the impact-absorbing member 1 as in the third embodiment is employed, it is possible to stably cause the axial collapse deformation at the collision-side end portion E while suppressing the bending deformation at the non-collision-side end portion E'. This makes it possible to increase the impact-absorbing performance. Note that a dashed line in FIG. 27 indicates a neutral axis N connecting gravity centers of cross sections perpendicular to the vehicle length direction L from the collision-side end portion E to the non-collision-side end portion E'.

As described above, in a case where the collision-side end portion E of the impact-absorbing member 1 is positioned on the vehicle inner side in the offset direction (the vehicle width direction W in the third embodiment) relative to the non-collision-side end portion E', when the impact-absorbing member 1 with a configuration such that the position of the gravity center in the cross section perpendicular to the vehicle length direction L shifts to the vehicle inner side in the vehicle width direction W from the collision-side end portion E toward the non-collision-side end portion E' as in the third embodiment is employed, it is possible to stably cause the axial collapse deformation at the collision-side end portion E, and suppress the bending deformation at the non-collision-side end portion E'. In other words, by reducing a difference between the tensile stress on the vehicle outer side in the vehicle width direction W of the impact-absorbing member 1 at the collision-side end portion E and the compressive stress on the vehicle inner side in the vehicle width direction W of the impact-absorbing member 1 at the non-collision-side end portion E', it is possible to stably cause the axial collapse deformation at the collision-side end portion E and suppress the bending deformation at the non-collision-side end portion E'.

Note that when the collision-side end portion E of the impact-absorbing member 1 is positioned on the vehicle inner side in the vehicle width direction W relative to the non-collision-side end portion E', the length $W_{in}$ in the vehicle width direction from the top portion 3b of the inner member 3 to the joined surface J at the collision-side end portion E and the length $W_{in}'$ in the vehicle width direction from the top portion 3b of the inner member 3 to the joined surface J at the non-collision-side end portion E' preferably satisfy $W_{in} \geq W_{in}' \times 2.8$. Consequently, it is possible to sufficiently reduce the difference between the tensile stress in the vehicle length direction L on the vehicle outer side in the vehicle width direction W at the collision-side end portion E and the compressive stress in the vehicle length direction L on the vehicle inner side in the vehicle width direction W at the non-collision-side end portion E', and the impact-absorbing performance can be improved when compared to a case of $W_{in} < W_{in}' \times 2.8$. Further, a more preferable relationship between $W_{in}$ and $W_{in}'$ is $W_{in} \geq W_{in}' \times 3$.

Further, $W_{in}'$ preferably satisfies $W_{in}' \geq 8$ mm. This makes it possible to increase the flexural rigidity and the strength of the inner member 3. As a result of this, it is possible to suppress the bending deformation at the non-collision-side end portion E' when compared to a case of $W_{in}' < 8$ mm, and the impact-absorbing performance can be improved. A more preferable range of $W_{in}'$ is $W_{in}' \geq 10$ mm.

Besides, the impact-absorbing member 1 satisfying $W_{in} \geq W_{in}' \times 3$ and satisfying $W_{in}' \geq 10$ mm can further improve the impact-absorbing performance.

Further, from a viewpoint of improvement of the impact-absorbing performance, it is preferable that a length L1 in the vehicle length direction L of the impact-absorbing member 1 is in a range of 300 mm≤L1≤650 mm, and the ratio between the offset amount $W_0$ in the vehicle width direction W between the collision-side end portion E and the non-collision-side end portion E' and L1 satisfies $0.017 \le W_0/L1 \le 0.087$. In a range of L1<300 mm or $W_0/L1<0.017$, the effect of suppressing the moment of bending the non-collision-side end portion E' is small, and thus the effect of suppressing the bending deformation at the non-collision-side end portion E' is small. Further, in a range of 650 mm<L1 or $0.087<W_0/L1$, the moment of bending the collision-side end portion E is excessive, resulting in that the effect of suppressing the bending deformation becomes small. Note that a more preferable numerical range of the length L1 in the vehicle length direction L of the impact-absorbing member 1 is 400 mm≤L1≤600 mm. Further, a more preferable numerical range of the ratio between the offset amount $W_0$ in the vehicle width direction W between the collision-side end portion E and the non-collision-side end portion E' and L1 is $0.035 \le W_0/L1 \le 0.070$.

Fourth Embodiment

Figure 4:
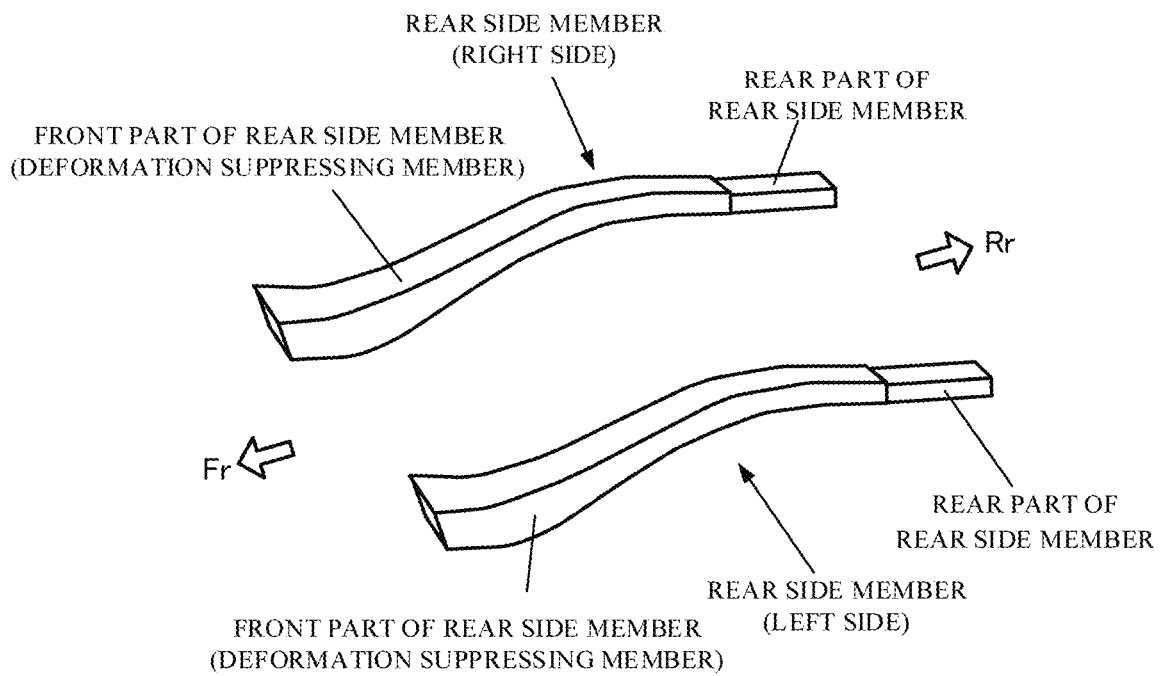
FIG. 4 is a perspective view illustrating one example of a shape of rear side members.
Figure 5:
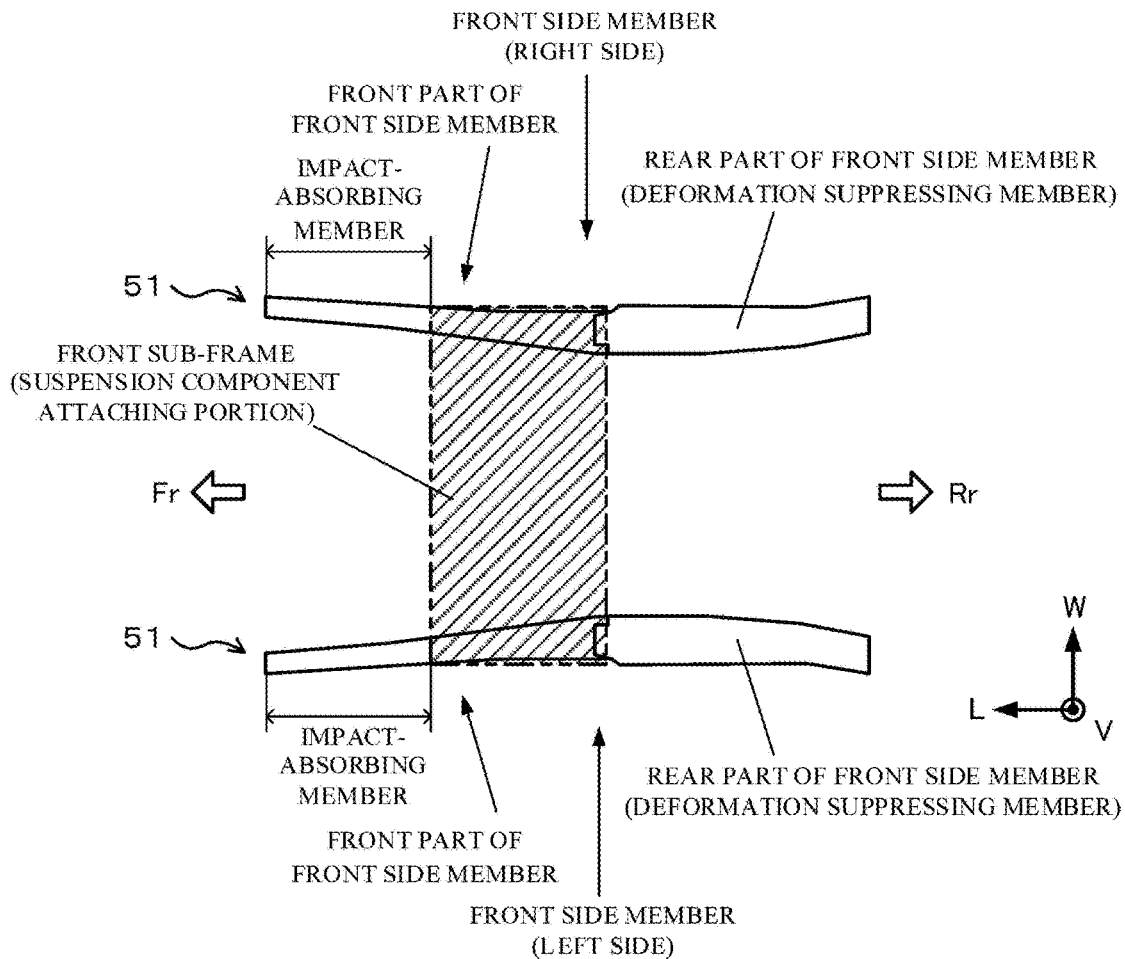
FIG. 5 is a plan view of front side members which are exemplified for explaining a definition of an impact-absorbing member.
Figure 6:
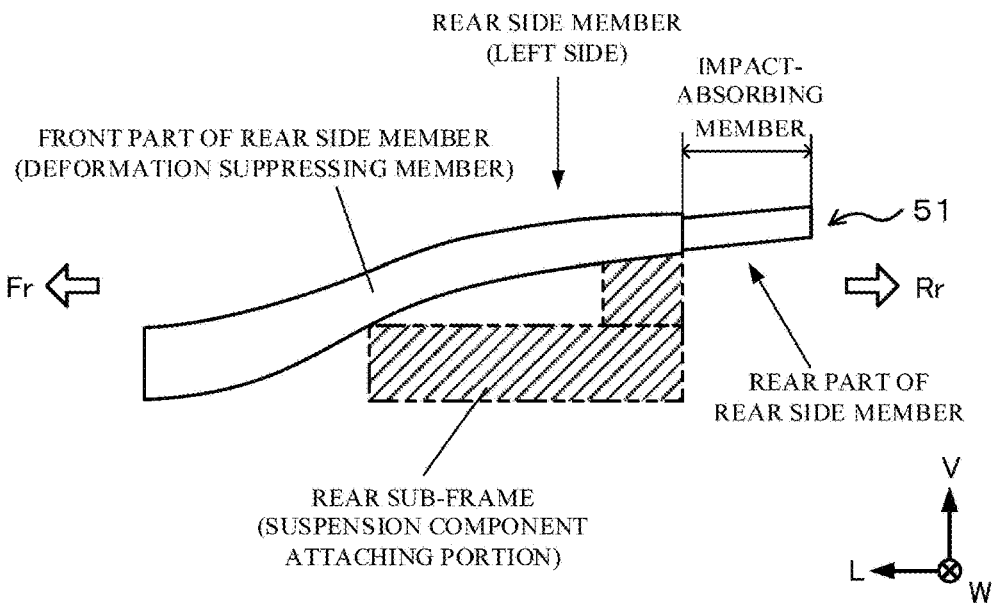
FIG. 6 is a side view of a rear side member which is exemplified for explaining a definition of an impact-absorbing member.
Figure 7:
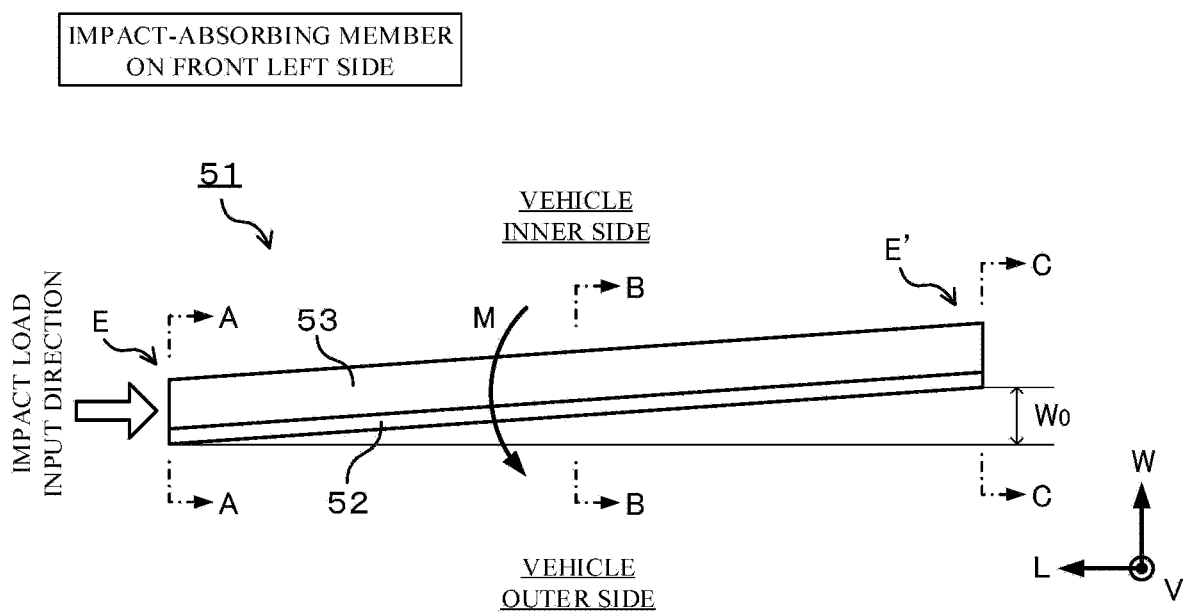
FIG. 7 is a view illustrating a schematic shape of a conventional impact-absorbing member (front left side).
Figure 28:
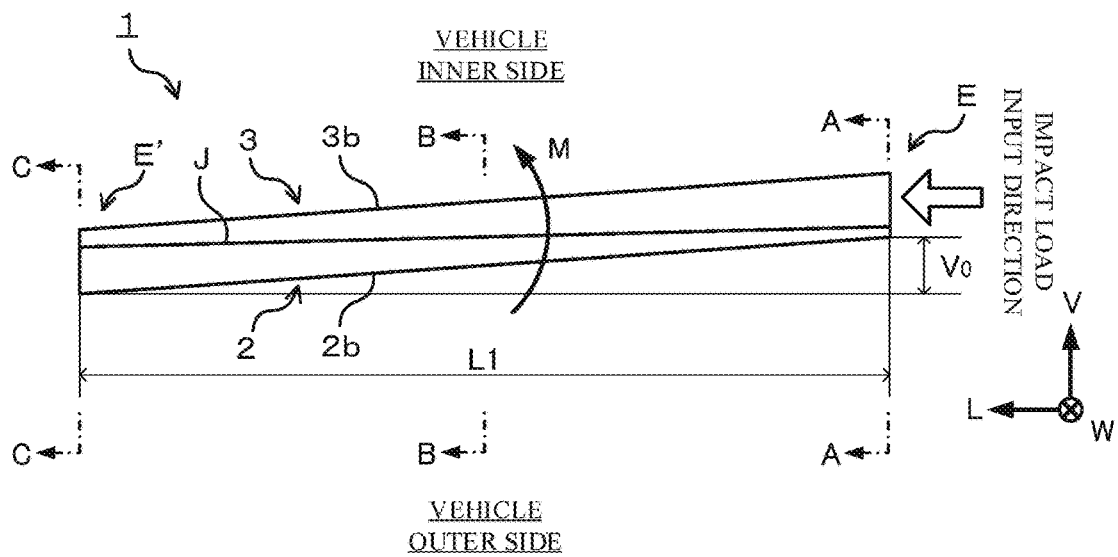
FIG. 28 is a side view illustrating a schematic shape of an impact-absorbing member (rear left side) according to a fourth embodiment of the present invention.

In each of the first to third embodiments, the embodiment of the present invention has been described by citing the impact-absorbing member of the front side member as an example, but, in a fourth embodiment, an embodiment of the present invention will be described by citing an impact-absorbing member of a rear side member as an example. An impact-absorbing member exemplified in the fourth embodiment is an impact-absorbing member of a rear side member (left side) having a shape as illustrated in FIG. 4. As illustrated in FIG. 28, an impact-absorbing member 1 in the fourth embodiment has a shape in which a collision-side end portion E is offset by a displacement $V_0$ on a vehicle inner side in a vertical direction V relative to a non-collision-side end portion E'. Note that FIG. 28 exemplifies the impact-absorbing member 1 on the rear left side, but, as an impact-absorbing member on a rear right side, one with a shape of the impact-absorbing member 1 on the rear left side which is laterally inverted when seen from a vehicle length direction L, for example, is applied.

Figure 29:
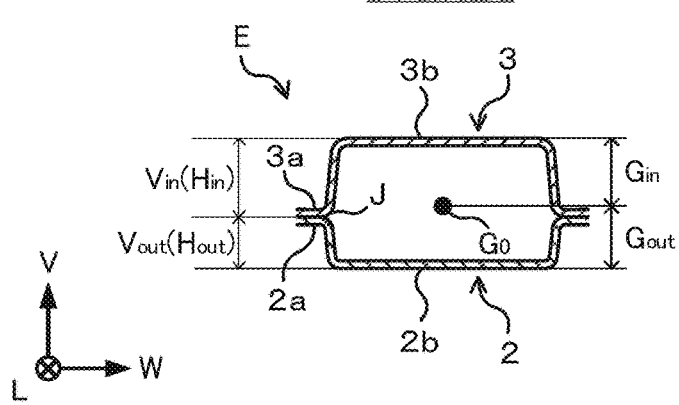
FIG. 29 is a sectional view taken along A-A in FIG. 28.
Figure 30:
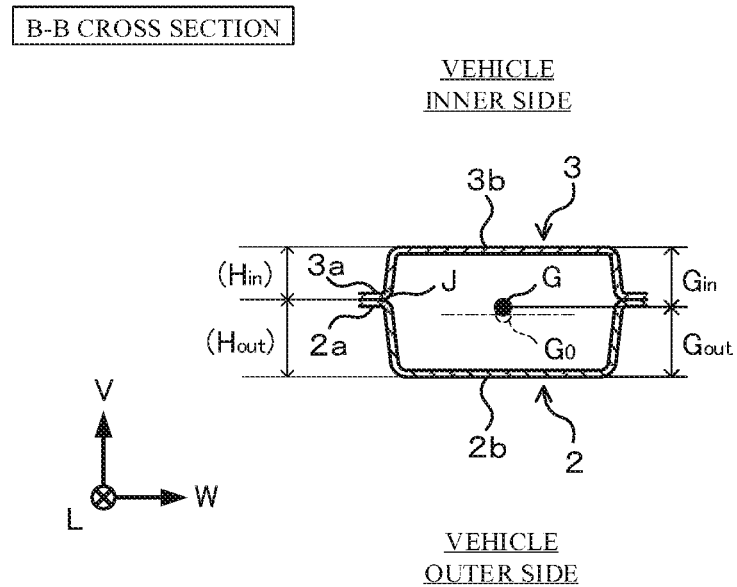
FIG. 30 is a sectional view taken along B-B in FIG. 28.
Figure 31:
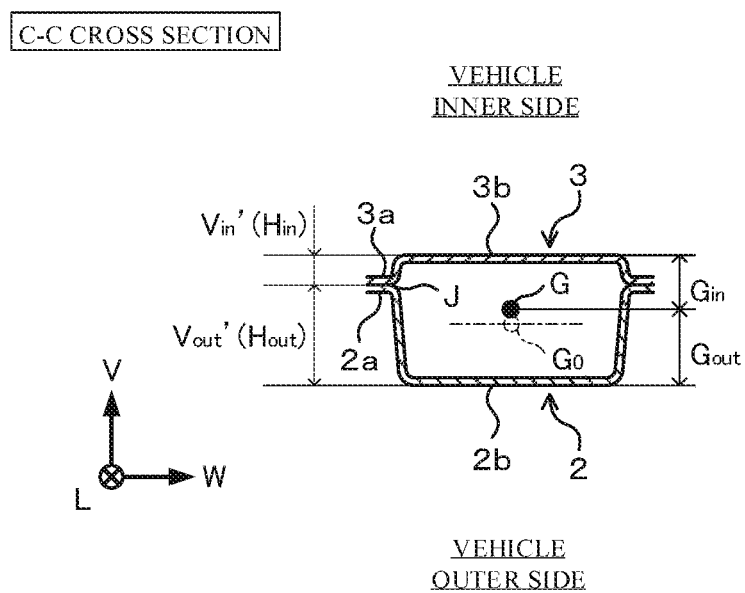
FIG. 31 is a sectional view taken along C-C in FIG. 28.

The impact-absorbing member 1 is formed of an outer member 2 and an inner member 3. As illustrated in FIG. 29 to FIG. 31, a cross section perpendicular to the vehicle length direction L of each of the outer member 2 and the inner member 3 has a so-called hat shape, and flange portions 2a, 3a projecting in a vehicle width direction W are formed on the outer member 2 and the inner member 3. Surfaces of the flange portions 2a, 3a of the outer member 2 and the inner member 3 are put together to join the members. Consequently, the impact-absorbing member 1 has a shape of a closed section when seen from the vehicle length direction L. Further, as illustrated in FIG. 28, when seen from a direction in which the flange portions 2a, 3a are projected (the vehicle width direction W in the fourth embodiment), the outer member 2 and the inner member 3 are formed so that a joined surface J has a straight shape.

As illustrated in FIG. 29, in a cross section of the collision-side end portion E when seen from the vehicle length direction L, a length $V_{out}$ in the vertical direction (which is also referred to as a hat height $H_{out}$) from a top portion 2b of the outer member 2 to the joined surface J is shorter than a length $V_{in}$ in the vertical direction (which is also referred to as a hat height $H_{in}$) from a top portion 3b of the inner member 3 to the joined surface J. As illustrated in FIG. 29 to FIG. 31, the length in the vertical direction from the top portion 2b of the outer member 2 to the joined surface J increases from the collision-side end portion E toward the non-collision-side end portion E'. On the other hand, the length in the vertical direction from the top portion 3b of the inner member 3 to the joined surface J decreases from the collision-side end portion E toward the non-collision-side end portion E'. Further, as illustrated in FIG. 31, at the non-collision-side end portion E', a length $V_{out}'$ in the vertical direction from the top portion 2b of the outer member 2 to the joined surface J is longer than a length $V_{in}'$ in the vertical direction from the top portion 3b of the inner member 3 to the joined surface J.

When the impact-absorbing member 1 having a shape as above is employed, a gravity center at the non-collision-side end portion E' shifts to the vehicle inner side in the vertical direction V relative to a gravity center at the collision-side end portion E, in accordance with a change in positions of the flange portions 2a, 3a in the impact-absorbing member 1 in the vertical direction V. For this reason, as illustrated in FIG. 29 to FIG. 31 as well, a position of a gravity center G of the impact-absorbing member 1 shifts to the vehicle inner side in the vertical direction V from a position of a gravity center $G_0$ at the collision-side end portion E, as it approaches from the collision-side end portion E toward the non-collision-side end portion E'. Note that in FIG. 30 and FIG. 31, the position of the gravity center $G_0$ at the collision-side end portion E illustrated in FIG. 29 is indicated by a dotted line.

Figure 32:
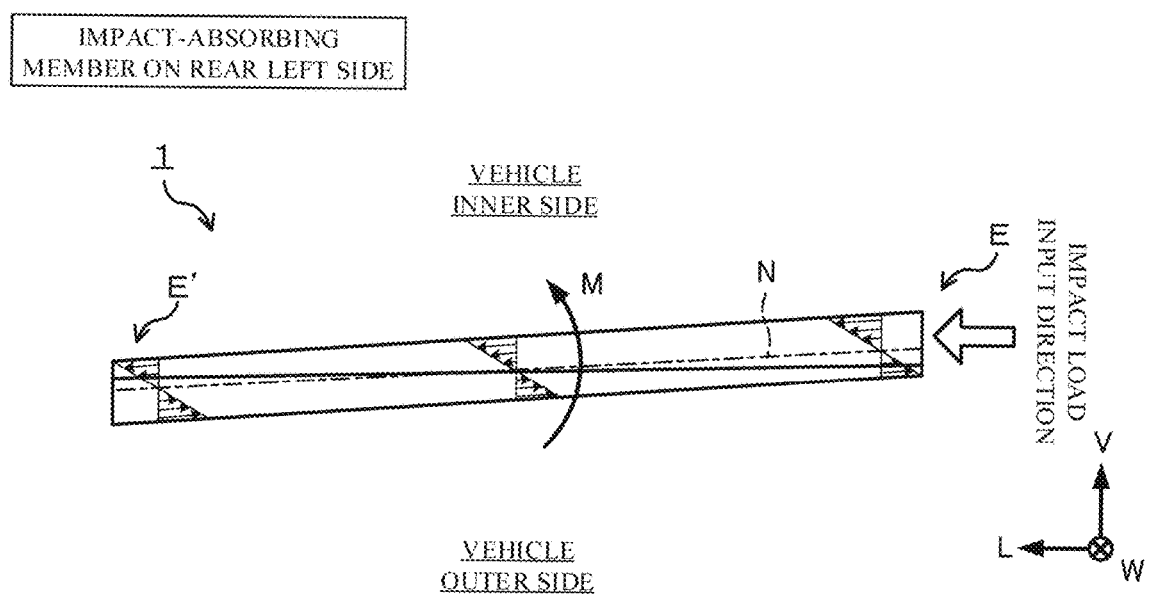
FIG. 32 is a view illustrating a stress distribution chart when an impact load is input in the impact-absorbing member (rear left side) according to the fourth embodiment of the present invention.

In the impact-absorbing member 1 of the fourth embodiment, a bending moment M in a counterclockwise direction when seen from the vehicle outer side in the vehicle width direction W as illustrated in FIG. 28 is generated in a rear-end collision. Meanwhile, the impact-absorbing member 1 in the fourth embodiment has a shape such that the position of the gravity center shifts to the vehicle inner side in the vertical direction V from the collision-side end portion E toward the non-collision-side end portion E', as described above. Accordingly, when it is assumed that the bending moment M is constant along the vehicle length direction L, a tensile stress on the vehicle outer side in the vertical direction V of the impact-absorbing member 1 generated at the collision-side end portion E due to the bending moment M becomes smaller than a tensile stress generated at the non-collision-side end portion E', as in a stress distribution chart illustrated in FIG. 32. Besides, a compressive stress on the vehicle inner side in the vertical direction V generated at the non-collision-side end portion E' due to the bending moment M becomes smaller than a compressive stress generated at the collision-side end portion E.

As a result of this, when compared to the conventional impact-absorbing member as illustrated in FIG. 8 to FIG. 10 in which the position of the gravity center in the cross section perpendicular to the vehicle length direction L does not change from the collision-side end portion E toward the non-collision-side end portion E', and which has the stress distribution as illustrated in FIG. 11, it becomes possible to suppress the induction of the bending deformation at the non-collision-side end portion E' and it is possible to improve the situation where the vehicle outer side in the vertical direction V of the collision-side end portion E is difficult to be buckled. Specifically, in a case where the collision-side end portion E is positioned on the vehicle inner side in the offset direction (the vertical direction V in the fourth embodiment) relative to the non-collision-side end portion E', when the impact-absorbing member 1 as in the fourth embodiment is employed, it is possible to stably cause the axial collapse deformation at the collision-side end portion E while suppressing the bending deformation at the non-collision-side end portion E'. This makes it possible to increase the impact-absorbing performance. Note that a dashed line in FIG. 32 indicates a neutral axis N connecting gravity centers of cross sections perpendicular to the vehicle length direction L from the collision-side end portion E to the non-collision-side end portion E'.

As described above, in a case where the collision-side end portion E of the impact-absorbing member 1 is positioned on the vehicle inner side in the offset direction (the vertical direction V in the fourth embodiment) relative to the non-collision-side end portion E', when the impact-absorbing member 1 with a configuration such that the position of the gravity center in the cross section perpendicular to the vehicle length direction L shifts to the vehicle inner side in the vertical direction V from the collision-side end portion E toward the non-collision-side end portion E' as in the fourth embodiment is employed, it is possible to stably cause the axial collapse deformation at the collision-side end portion E, and suppress the bending deformation at the non-collision-side end portion E'. In other words, by reducing a difference between the tensile stress on the vehicle outer side in the vertical direction V of the impact-absorbing member 1 at the collision-side end portion E and the compressive stress on the vehicle inner side in the vertical direction V of the impact-absorbing member 1 at the non-collision-side end portion E', it is possible to stably cause the axial collapse deformation at the collision-side end portion E and suppress the bending deformation at the non-collision-side end portion E'.

Note that when the collision-side end portion E of the impact-absorbing member 1 is positioned on the vehicle inner side in the vertical direction V relative to the non-collision-side end portion E', the length $V_{in}$ in the vertical direction from the top portion 3b of the inner member 3 to the joined surface J at the collision-side end portion E and the length $V_{in}'$ in the vertical direction from the top portion 3b of the inner member 3 to the joined surface J at the non-collision-side end portion E' preferably satisfy $V_{in} \geq V_{in}' \times 2.8$. Consequently, it is possible to sufficiently reduce the difference between the tensile stress in the vehicle length direction L on the vehicle outer side in the vertical direction V at the collision-side end portion E and the compressive stress in the vehicle length direction L on the vehicle inner side in the vertical direction V at the non-collision-side end portion E', and the impact-absorbing performance can be improved when compared to a case of $V_{in} < V_{in}' \times 2.8$. Further, a more preferable relationship between $V_{in}$ and $V_{in}'$ is $V_{in} \geq V_{in}' \times 3$.

Further, $V_{in}'$ preferably satisfies $V_{in}'$ 8 mm. This makes it possible to increase the flexural rigidity and the strength of the inner member 3. As a result of this, it is possible to suppress the bending deformation at the non-collision-side end portion E' when compared to a case of $V_{in}' < 8$ mm, and the impact-absorbing performance can be improved. A more preferable range of $V_{in}'$ is $V_{in}' \geq 10$ mm.

Besides, the impact-absorbing member 1 satisfying $V_{in} \geq V_{in}' \times 3$ and satisfying $V_{in}' \geq 10$ mm can further improve the impact-absorbing performance.

Further, from a viewpoint of improvement of the impact-absorbing performance, it is preferable that a length L1 in the vehicle length direction L of the impact-absorbing member 1 is in a range of 300 mm≤L1≤650 mm, and the ratio between the offset amount $V_0$ in the vertical direction V between the collision-side end portion E and the non-collision-side end portion E' and L1 satisfies $0.017 \leq V_0/L1 \leq 0.087$. In a range of L1<300 mm or $V_0/L1<0.017$, the effect of suppressing the moment of bending the non-collision-side end portion E' is small, and thus the effect of suppressing the bending deformation at the non-collision-side end portion E' is small. Further, in a range of 650 mm<L1 or $0.087<V_0/L1$, the moment of bending the collision-side end portion E is excessive, resulting in that the effect of suppressing the bending deformation becomes small. Note that a more preferable numerical range of the length L1 in the vehicle length direction L of the impact-absorbing member 1 is 400 mm≤L1≤600 mm. Further, a more preferable numerical range of the ratio between the offset amount $V_0$ in the vertical direction V between the collision-side end portion E and the non-collision-side end portion E' and L1 is $0.035 \leq V_0/L1 \leq 0.070$.

Fifth Embodiment

Figure 33:
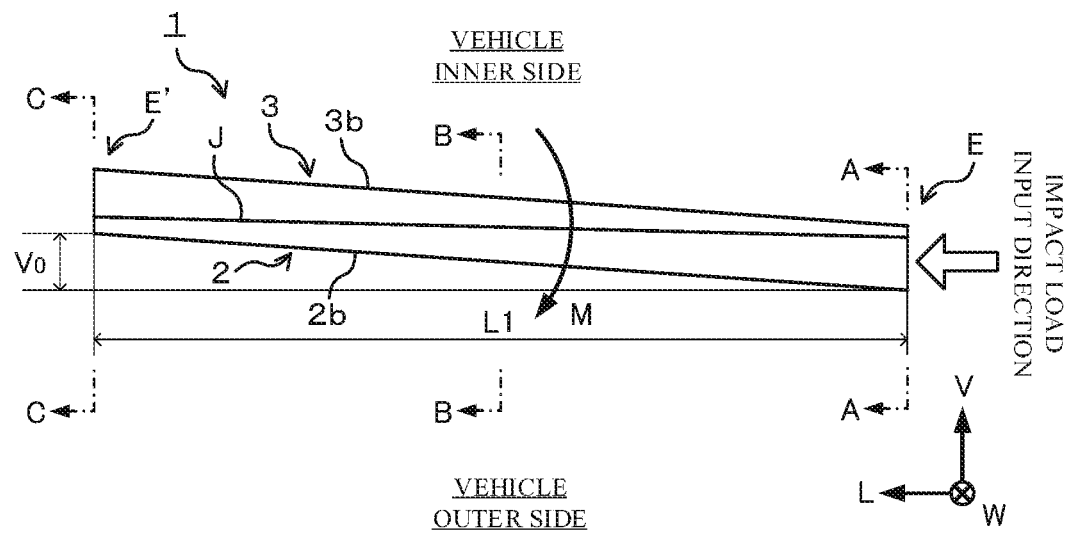
FIG. 33 is a side view illustrating a schematic shape of an impact-absorbing member (rear left side) according to a fifth embodiment of the present invention.

An impact-absorbing member in a fifth embodiment is also an impact-absorbing member of a rear side member (left side), similarly to the fourth embodiment. However, the impact-absorbing member in the fifth embodiment has a positional relationship between a collision-side end portion E and a non-collision-side end portion E', which is opposite to that of the impact-absorbing member in the fourth embodiment. Specifically, the impact-absorbing member in the fifth embodiment has a shape in which the collision-side end portion E is offset by a displacement $V_0$ on a vehicle outer side in a vertical direction V relative to the non-collision-side end portion E', as illustrated in FIG. 33.

Figure 34:
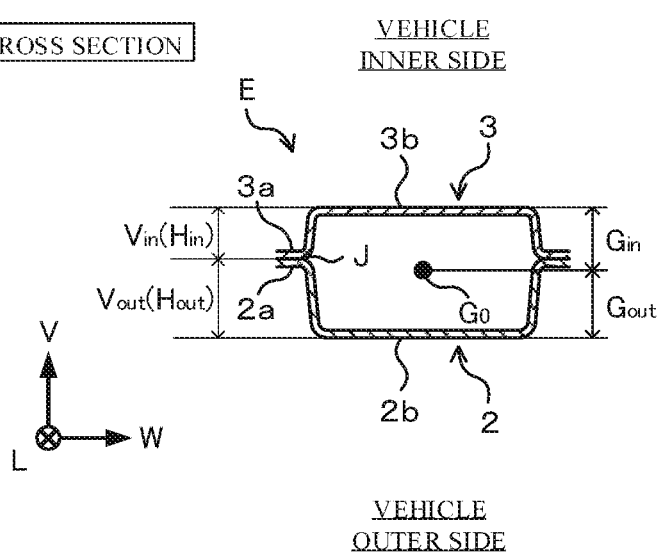
FIG. 34 is a sectional view taken along A-A in FIG. 33.
Figure 35:
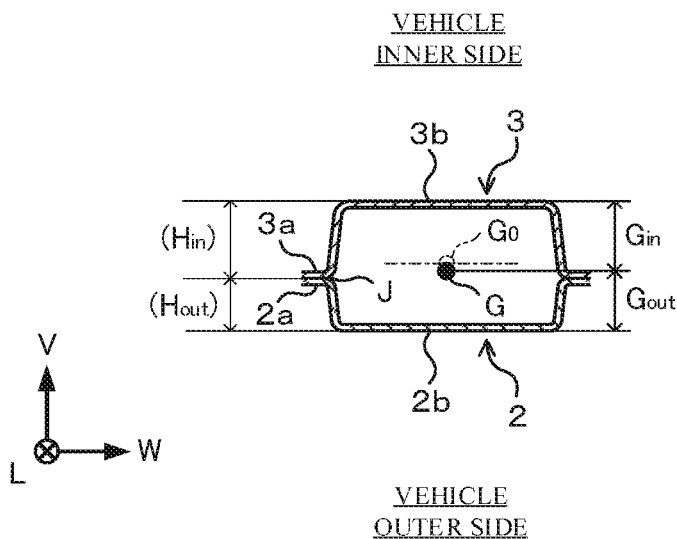
FIG. 35 is a sectional view taken along B-B in FIG. 33.
Figure 36:
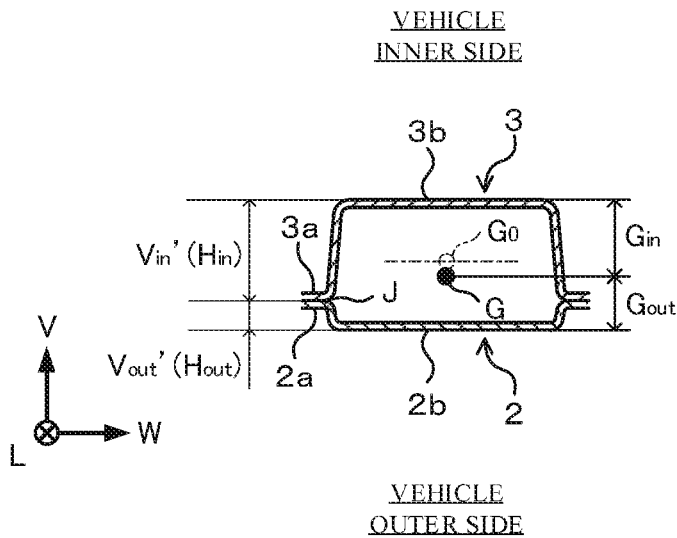
FIG. 36 is a sectional view taken along C-C in FIG. 33.

An impact-absorbing member 1 is formed of an outer member 2 and an inner member 3. As illustrated in FIG. 34 to FIG. 36, a cross section perpendicular to a vehicle length direction L of each of the outer member 2 and the inner member 3 has a so-called hat shape, and flange portions 2a, 3a projecting in a vehicle width direction W are formed on the outer member 2 and the inner member 3, similarly to the fourth embodiment. Surfaces of the flange portions 2a, 3a of the outer member 2 and the inner member 3 are put together to join the members. Further, as illustrated in FIG. 33, when seen from a direction in which the flange portions 2a, 3a are projected (the vehicle width direction W in the fifth embodiment), the outer member 2 and the inner member 3 are formed so that a joined surface J has a straight shape.

As illustrated in FIG. 34, in a cross section of the collision-side end portion E when seen from the vehicle length direction L, a length $V_{out}$ in the vertical direction (which is also referred to as a hat height $H_{out}$) from a top portion 2b of the outer member 2 to the joined surface J is longer than a length $V_{in}$ in the vertical direction (which is also referred to as a hat height $H_{in}$) from a top portion 3b of the inner member 3 to the joined surface J in the fifth embodiment. As illustrated in FIG. 34 to FIG. 36, the length in the vertical direction from the top portion 2b of the outer member 2 to the joined surface J decreases from the collision-side end portion E toward the non-collision-side end portion E'. On the other hand, the length in the vertical direction from the top portion 3b of the inner member 3 to the joined surface J increases from the collision-side end portion E toward the non-collision-side end portion E'. Further, as illustrated in FIG. 36, at the non-collision-side end portion E', a length $V_{out}'$ in the vertical direction from the top portion 2b of the outer member 2 to the joined surface J is shorter than a length $V_{in}'$ in the vertical direction from the top portion 3b of the inner member 3 to the joined surface J.

In the fifth embodiment, a bending moment M generated in the impact-absorbing member 1 in a rear-end collision is a moment in a direction opposite to that of the bending moment M generated in the impact-absorbing member 1 in the fourth embodiment illustrated in FIG. 28. For this reason, the impact-absorbing member 1 in the fifth embodiment bends toward the vehicle outer side in the vertical direction V, which is different from the fourth embodiment.

Meanwhile, in the impact-absorbing member 1 in the fifth embodiment, a gravity center at the non-collision-side end portion E' shifts to the vehicle outer side in the vertical direction V relative to a gravity center at the collision-side end portion E, in accordance with a change in positions of the flange portions 2a, 3a in the impact-absorbing member 1 in the vertical direction V. Accordingly, as illustrated in FIG. 34 to FIG. 36 as well, a position of a gravity center G of the impact-absorbing member 1 shifts to the vehicle outer side in the vertical direction V from a position of a gravity center $G_0$ at the collision-side end portion E, as it approaches from the collision-side end portion E toward the non-collision-side end portion E'. Note that in FIG. 35 and FIG. 36, the position of the gravity center $G_0$ at the collision-side end portion E illustrated in FIG. 34 is indicated by a dotted line.

Figure 37:
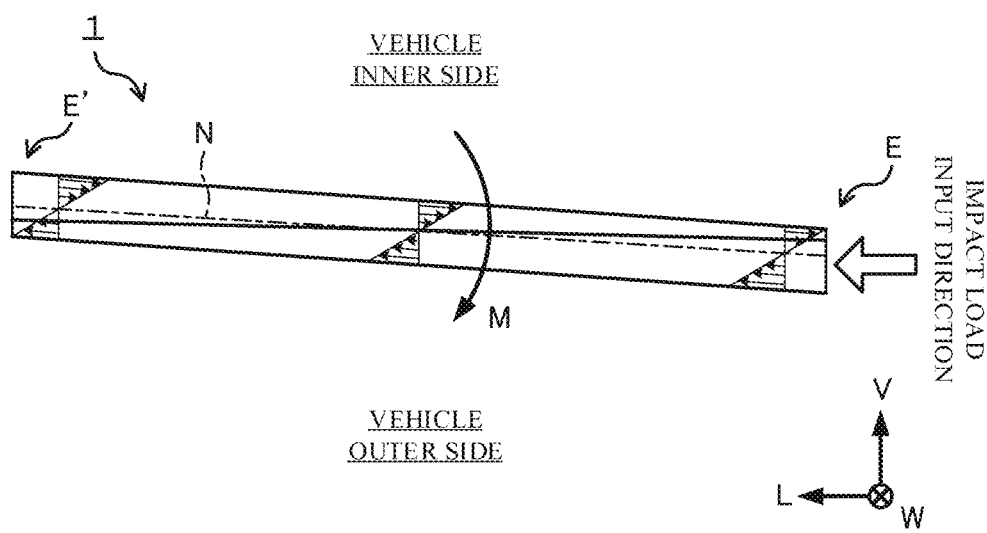
FIG. 37 is a view illustrating a stress distribution chart when an impact load is input in the impact-absorbing member (rear left side) according to the fifth embodiment of the present invention.

Since the gravity center at the collision-side end portion E and the gravity center at the non-collision-side end portion E' satisfy such a positional relationship, when it is assumed that the bending moment M is constant along the vehicle length direction L, a tensile stress on the vehicle inner side in the vertical direction V generated at the collision-side end portion E due to the bending moment M becomes smaller than a tensile stress generated at the non-collision-side end portion E', as in a stress distribution chart illustrated in FIG. 37. Meanwhile, a compressive stress on the vehicle outer side in the vertical direction V generated at the non-collision-side end portion E' due to the bending moment M becomes smaller than a compressive stress generated at the collision-side end portion E. Note that a dashed line in FIG. 37 indicates a neutral axis N connecting gravity centers of cross sections perpendicular to the vehicle length direction L from the collision-side end portion E to the non-collision-side end portion E'.

As a result of this, when compared to the conventional impact-absorbing member as illustrated in FIG. 8 to FIG. 10 in which the position of the gravity center in the cross section perpendicular to the vehicle length direction L does not change from the collision-side end portion E toward the non-collision-side end portion E', and which has the stress distribution as illustrated in FIG. 11, it becomes possible to suppress the induction of the bending deformation at the non-collision-side end portion E' and it is possible to improve the situation where the vehicle outer side in the vertical direction V of the collision-side end portion E is difficult to be buckled. Specifically, in a case where the collision-side end portion E is positioned on the vehicle outer side in the offset direction (the vertical direction V in the fifth embodiment) relative to the non-collision-side end portion E', when the impact-absorbing member 1 as in the fifth embodiment is employed, it is possible to stably cause the axial collapse deformation at the collision-side end portion E while suppressing the bending deformation at the non-collision-side end portion E'. This makes it possible to increase the impact-absorbing performance.

As described above, in a case where the collision-side end portion E of the impact-absorbing member 1 is positioned on the vehicle outer side in the offset direction (the vertical direction V in the fifth embodiment) relative to the non-collision-side end portion E', when the impact-absorbing member 1 with a configuration such that the position of the gravity center in the cross section perpendicular to the vehicle length direction L shifts to the vehicle outer side in the vertical direction V from the collision-side end portion E toward the non-collision-side end portion E' as in the fifth embodiment is employed, it is possible to stably cause the axial collapse deformation at the collision-side end portion E, and suppress the bending deformation at the non-collision-side end portion E'. In other words, by reducing a difference between the tensile stress on the vehicle inner side in the vertical direction V of the impact-absorbing member 1 at the collision-side end portion E and the compressive stress on the vehicle outer side in the vertical direction V of the impact-absorbing member 1 at the non-collision-side end portion E', it is possible to stably cause the axial collapse deformation at the collision-side end portion E and suppress the bending deformation at the non-collision-side end portion E'.

Note that when the collision-side end portion E is positioned on the vehicle outer side in the vertical direction V relative to the non-collision-side end portion E', the length $V_{out}$ in the vertical direction from the top portion 2b of the outer member 2 to the joined surface J at the collision-side end portion E and the length $V_{out}'$ in the vertical direction from the top portion 2b of the outer member 2 to the joined surface J at the non-collision-side end portion E' preferably satisfy $V_{out} \geq V_{out}' \times 2.8$. Consequently, it is possible to sufficiently reduce the difference between the tensile stress in the vehicle length direction L on the vehicle inner side in the vertical direction V at the collision-side end portion E and the compressive stress in the vehicle length direction L on the vehicle outer side in the vertical direction V at the non-collision-side end portion E', and the impact-absorbing performance can be improved when compared to a case of $V_{out} < V_{out}' \times 2.8$. Further, a more preferable relationship between $V_{out}$ and $V_{out}'$ is $V_{out} \geq V_{out}' \times 3$.

Further, $V_{out}'$ preferably satisfies $V_{out}' \geq 8$ mm. This makes it possible to increase the flexural rigidity and the strength of the outer member 2. As a result of this, it is possible to suppress the bending deformation at the non-collision-side end portion E' when compared to a case of $V_{out}' < 8$ mm, and the impact-absorbing performance can be improved. A more preferable range of $V_{out}'$ is $V_{out}' \geq 10$ mm.

Besides, the impact-absorbing member 1 satisfying $V_{out} \geq V_{out}' \times 3$ and satisfying $V_{out}' \geq 10$ mm can further improve the impact-absorbing performance.

Further, from a viewpoint of improvement of the impact-absorbing performance, it is preferable that a length L1 in the vehicle length direction L of the impact-absorbing member 1 is in a range of 300 mm≤L1≤650 mm, and the ratio between the offset amount $V_0$ in the vertical direction V between the collision-side end portion E and the non-collision-side end portion E' and L1 satisfies $0.017 \leq V_0/L1 \leq 0.087$. In a range of L1<300 mm or $V_0/L1<0.017$, the effect of suppressing the moment of bending the non-collision-side end portion E' is small, and thus the effect of suppressing the bending deformation at the non-collision-side end portion E' is small. Further, in a range of 650 mm<L1 or $0.087<V_0/L1$, the moment of bending the collision-side end portion E is excessive, resulting in that the effect of suppressing the bending deformation becomes small. Note that a more preferable numerical range of the length L1 in the vehicle length direction L of the impact-absorbing member 1 is 400 mm≤L1≤600 mm. Further, a more preferable numerical range of the ratio between the offset amount $V_0$ in the vertical direction V between the collision-side end portion E and the non-collision-side end portion E' and L1 is 0.035 $V_0/L1 \leq 0.070$.

Although the impact-absorbing member in each of the first to fifth embodiments has been described above, the shape of the impact-absorbing member is not limited to one described in each of the first to fifth embodiments.

For example, in each of the first to fifth embodiments, the flange portion 2a of the outer member 2 and the flange portion 3a of the inner member 3 are formed to project toward the outside of the closed section of the impact-absorbing member 1, but, the flange portions 2a, 3a may also be formed so as to project toward the inside of the closed section. Further, the outer member 2 and the inner member 3 may also be formed so that at least a part of the joined surface J when seen from the flange projecting direction has a curved shape. Specifically, each of the first to fifth embodiments exemplifies the case where the rate of increase of the ratio of hat heights ($H_{in}+H_{out}$) is constant, but, the shape of the flange portions 2a, 3a when seen from the flange projecting direction is not limited to a straight shape, but may also be a curved shape. Further, the shape may also have a straight portion and a curved portion. When the shape of the flange portions 2a, 3a when seen from the flange projecting direction has a curved portion as described above, the rate of increase of the ratio of hat heights ($H_{in}+H_{out}$) is only required to be 0.033 or more on the average. However, a shape with a joined surface such as one having an inflection point in the middle thereof is not preferable since there is a possibility that the impact-absorbing member is broken at the inflection point when an impact load is input. Further, for example, sizes in the vehicle width direction W and sizes in the vertical direction V of the collision-side end portion E and the non-collision-side end portion E' may be mutually different. Furthermore, in the impact-absorbing member 1 in each of the first to fifth embodiments, each of the top portion 2b of the outer member 2 and the top portion 3b of the inner member 3 has a planar shape, but, it may also have a shape with a curved portion.

As described above, various shapes can be considered as the shape of the impact-absorbing member, but, in order to improve the impact-absorbing performance, it becomes important that the position of the gravity center is shifted in an appropriate direction from the collision-side end portion E toward the non-collision-side end portion E' in accordance with the offset state of the collision-side end portion E and the non-collision-side end portion E'. Here, in a cross section perpendicular to the vehicle length direction L of the outer member 2 and the inner member 3, a ratio between a length $G_{in}$, which is the length in the offset direction from the gravity center G of the cross section to the top portion 3b of the inner member 3, and a length $G_{out}$, which is the length in the offset direction from the gravity center G of the cross section to the top portion 2b of the outer member 2, ($G_{in}/G_{out}$) is defined as a "ratio of gravity centers".

In the first embodiment, the collision-side end portion E is positioned on the "vehicle outer side" in the offset direction relative to the non-collision-side end portion E', and the ratio of gravity centers ($G_{in}/G_{out}$) increases from the collision-side end portion E toward the non-collision-side end portion E', as illustrated in FIG. 13 to FIG. 15. In the second embodiment, the collision-side end portion E is positioned on the "vehicle outer side" in the offset direction relative to the non-collision-side end portion E', and the ratio of gravity centers ($G_{in}/G_{out}$) increases from the collision-side end portion E toward the non-collision-side end portion E', as illustrated in FIG. 18 to FIG. 20. In the third embodiment, the collision-side end portion E is positioned on the "vehicle inner side" in the offset direction relative to the non-collision-side end portion E', and the ratio of gravity centers ($G_{in}/G_{out}$) decreases from the collision-side end portion E toward the non-collision-side end portion E', as illustrated in FIG. 24 to FIG. 26. In the fourth embodiment, the collision-side end portion E is positioned on the "vehicle inner side" in the offset direction relative to the non-collision-side end portion E', and the ratio of gravity centers ($G_{in}/G_{out}$) decreases from the collision-side end portion E toward the non-collision-side end portion E', as illustrated in FIG. 29 to FIG. 31. In the fifth embodiment, the collision-side end portion E is positioned on the "vehicle outer side" in the offset direction relative to the non-collision-side end portion E', and the ratio of gravity centers ($G_{in}/G_{out}$) increases from the collision-side end portion E toward the non-collision-side end portion E', as illustrated in FIG. 34 to FIG. 36.

Specifically, in order to improve the impact-absorbing performance of the impact-absorbing member 1, when the collision-side end portion E is positioned on the "vehicle outer side" in the offset direction relative to the non-collision-side end portion E', it is only required that the impact-absorbing member 1 is configured so that the ratio of gravity centers ($G_{in}/G_{out}$) increases from the collision-side end portion E toward the non-collision-side end portion E'. On the other hand, when the collision-side end portion E is positioned on the "vehicle inner side" in the offset direction relative to the non-collision-side end portion E', it is only required that the impact-absorbing member 1 is configured so that the ratio of gravity centers ($G_{in}/G_{out}$) decreases from the collision-side end portion E toward the non-collision-side end portion E'.

In other words, in order to improve the impact-absorbing performance of the impact-absorbing member 1 which extends in the vehicle length direction L of an automobile and whose both end portions in the vehicle length direction L are offset so that positions of the both end portions become mutually different when seen from the vehicle length direction L, when the ratio between the length $G_{in}$, which is the length in the offset direction from the gravity center of the cross section of the outer member 2 and the inner member 3 perpendicular to the vehicle length direction L to the top portion 3b of the inner member 3, and the length $G_{out}$, which is the length from the gravity center of the cross section to the top portion 2b of the outer member 2, ($G_{in}/G_{out}$) is defined as the ratio of gravity centers, the ratio of gravity centers is required to increase from a side of the end portion, out of the both end portions in the vehicle length direction L, whose position is offset toward the vehicle outer side when seen from the vehicle length direction L, toward another side of the end portion, whose position is offset toward the vehicle inner side when seen from the vehicle length direction L.

Further, when the ratio between the hat height $H_{in}$ of the inner member 3 and the hat height $H_{out}$ of the outer member 3 described above ($H_{in}/H_{out}$) is assumed to be defined as the ratio of hat heights, in the first embodiment in which the collision-side end portion E is positioned on the "vehicle outer side" in the offset direction relative to the non-collision-side end portion E', the ratio of hat heights ($H_{in}/H_{out}$) shifts to the vehicle outer side from the collision-side end portion E toward the non-collision-side end portion E', as illustrated in FIG. 13 to FIG. 15. In the second embodiment, the collision-side end portion E is positioned on the "vehicle outer side" in the offset direction relative to the non-collision-side end portion E', and the ratio of hat heights ($H_{in}/H_{out}$) shifts to the vehicle outer side from the collision-side end portion E toward the non-collision-side end portion E', as illustrated in FIG. 18 to FIG. 20. In the third embodiment, the collision-side end portion E is positioned on the "vehicle inner side" in the offset direction relative to the non-collision-side end portion E', and the ratio of hat heights ($H_{in}/H_{out}$) shifts to the vehicle inner side from the collision-side end portion E toward the non-collision-side end portion E', as illustrated in FIG. 24 to FIG. 26. In the fourth embodiment, the collision-side end portion E is positioned on the "vehicle inner side" in the offset direction relative to the non-collision-side end portion E', and the ratio of hat heights ($H_{in}/H_{out}$) shifts to the vehicle inner side from the collision-side end portion E toward the non-collision-side end portion E', as illustrated in FIG. 29 to FIG. 31. In the fifth embodiment, the collision-side end portion E is positioned on the "vehicle outer side" in the offset direction relative to the non-collision-side end portion E', and the ratio of hat heights ($H_{in}/H_{out}$) shifts to the vehicle outer side from the collision-side end portion E toward the non-collision-side end portion E', as illustrated in FIG. 34 to FIG. 36.

In other words, in order to improve the impact-absorbing performance of the impact-absorbing member 1 which extends in the vehicle length direction L of an automobile and whose both end portions in the vehicle length direction L are offset so that positions of the both end portions become mutually different when seen from the vehicle length direction L, when the ratio between the hat height $H_{in}$ of the inner member 3 and the hat height $H_{out}$ of the outer member 2 in the cross section perpendicular to the vehicle length direction L of the outer member 2 and the inner member 3 ($H_{in}/H_{out}$) is defined as the ratio of hat heights, the ratio of hat heights is only required to increase from a side of the end portion, out of the both end portions in the vehicle length direction L, whose position is offset toward the vehicle outer side when seen from the vehicle length direction L, toward another side of the end portion, whose position is offset toward the vehicle inner side when seen from the vehicle length direction L.

Although the embodiments of the present invention have been explained above, the present invention is not limited to such examples. It should be understood that various changes or modifications are readily apparent to those skilled in the art within the scope of the technical spirit as set forth in claims, and those should also be covered by the technical scope of the present invention.

EXAMPLES

Figure 38:
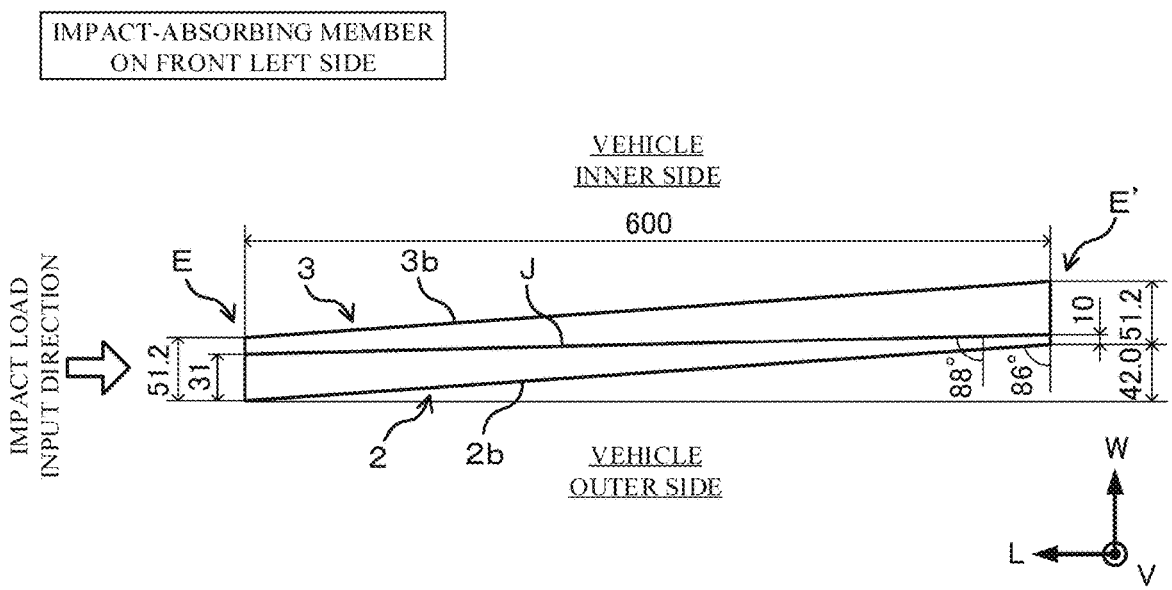
FIG. 38 is a plan view illustrating a verification model of an example of the present invention in an impact load input simulation.
Figure 39:
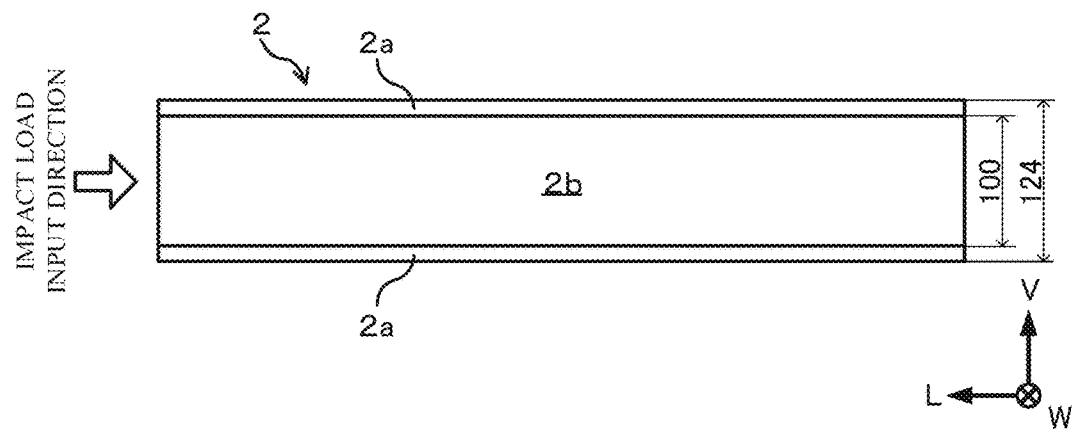
FIG. 39 is a side view illustrating a verification model of the example of the present invention in the impact load input simulation.

As an example for verifying the effect of the present invention, a model of an impact-absorbing member according to the present invention as illustrated in FIG. 38 and FIG. 39 was formed, and a simulation of applying an impact load to a collision-side end portion of the impact-absorbing member was conducted.

In the model of the example, a collision-side end portion E is positioned on a vehicle outer side in a vehicle width direction W relative to a non-collision-side end portion E'. A length $W_{out}$ in the vehicle width direction W from a top portion 2b of an outer member 2 to a joined surface J at the collision-side end portion E is 31 mm, and a length $W_{out}'$ in the vehicle width direction W from the top portion 2b of the outer member 2 to the joined surface J at the non-collision-side end portion E' is 10 mm. Specifically, $W_{out}/W_{out}'$ is 3.1. An offset amount $W_0$ in the vehicle width direction W is 42.0 mm, and a length L1 in a vehicle length direction of the impact-absorbing member is 600 mm. Specifically, $W_0/L1$ is 0.070. Note that in the example, $W_{in}/W_{out}=0.65$, $W_{in}'/W_{out}'=4.12$, and a rate of increase of $W_{in}/W_{out}$ which gradually increases from the collision-side end portion E toward the non-collision-side end portion E' ((4.12−0.65)/600) is 0.058. Further, a ratio of gravity centers ($G_{in}/G_{out}$) at the collision-side end portion E is 0.93, and a ratio of gravity centers ($G_{in}/G_{out}$) at the non-collision-side end portion E' is 1.19. A rate of increase of the ratio of gravity centers ($G_{in}/G_{out}$) is 0.0004 when it is calculated similarly to the rate of increase of $W_{in}/W_{out}$. An angle made by the top portion 2b of the outer member 2 and the vehicle length direction L in plan view is 86 degrees, and an angle made by the joined surface J and the vehicle length direction L in plan view is 88 degrees.

Figure 40:
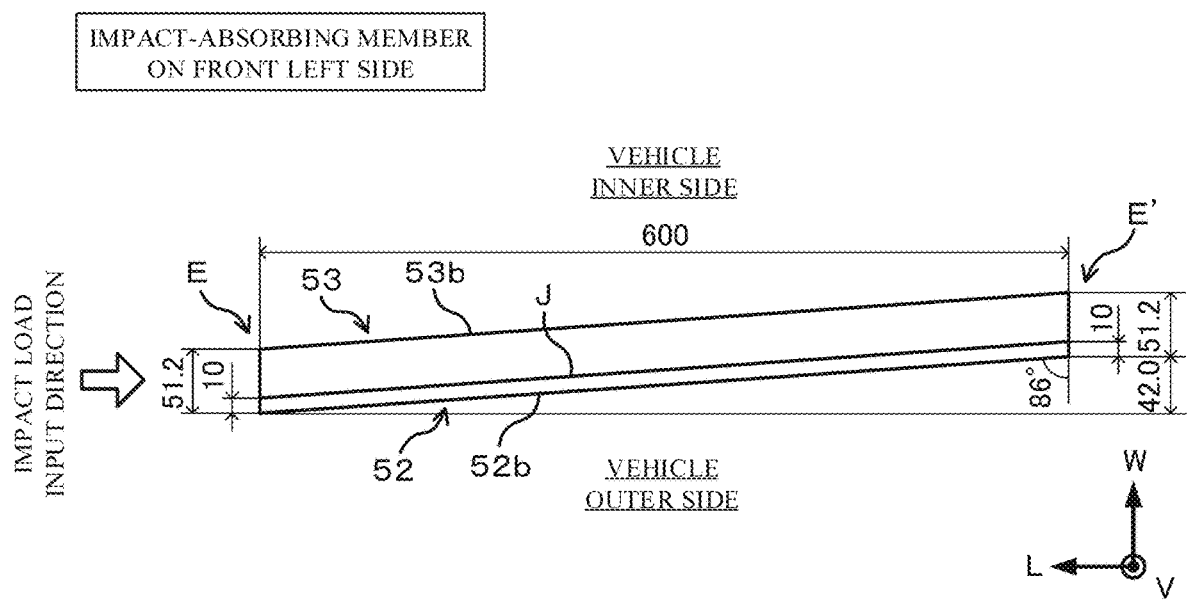
FIG. 40 is a plan view illustrating a verification model of a comparative example in an impact load input simulation.
Figure 41:
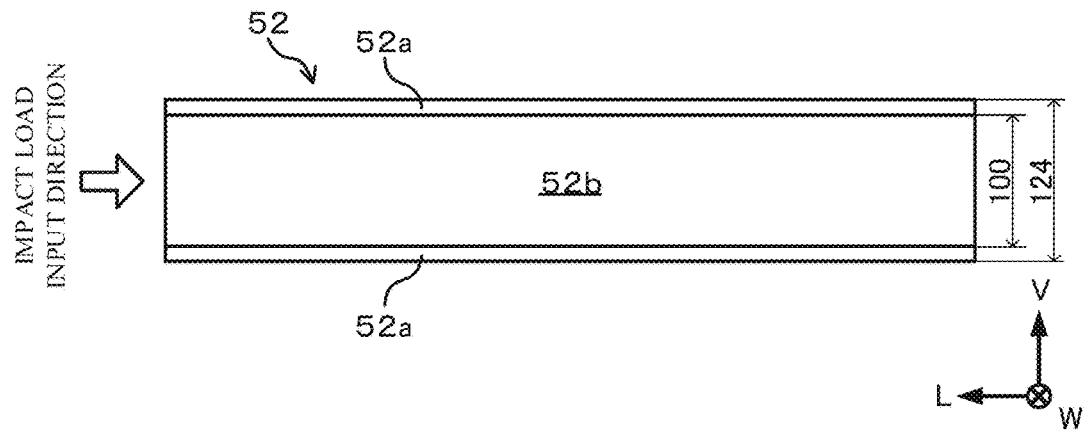
FIG. 41 is a side view illustrating a verification model of the comparative example in the impact load input simulation.

Further, as a comparative example, a model of a conventional impact-absorbing member as illustrated in FIG. 40 and FIG. 41 was formed, and a simulation of applying an impact load to a collision-side end portion of the impact-absorbing member was conducted.

In the model of the comparative example, a collision-side end portion E is positioned on a vehicle outer side in a vehicle width direction W relative to a non-collision-side end portion E', similarly to the example. A length $W_{out}$ in the vehicle width direction W from a top portion 52b of an outer member 52 to a joined surface J at the collision-side end portion E is 10 mm, and a length $W_{out}'$ in the vehicle width direction W from the top portion 52b of the outer member 52 to the joined surface J at the non-collision-side end portion E' is 10 mm. Specifically, $W_{out}/W_{out}'$ is 1.0. A length L1 in a vehicle length direction of the impact-absorbing member is 600 mm. Note that each of a rate of increase of $W_{in}/W_{out}$ and a rate of increase of a ratio of gravity centers ($G_{in}/G_{out}$) in the comparative example is 0. An angle made by the top portion 52b of the outer member 52 and the vehicle length direction L in plan view is 86 degrees, and an angle made by the joined surface J and the vehicle length direction L in plan view is also 86 degrees.

Note that in each of the impact-absorbing member of the example and the impact-absorbing member of the comparative example, physical property values are set on the assumption that each of the outer member and the inner member is a 590 MPa-class high-tension material with a sheet thickness of 1.2 mm.

Figure 42:
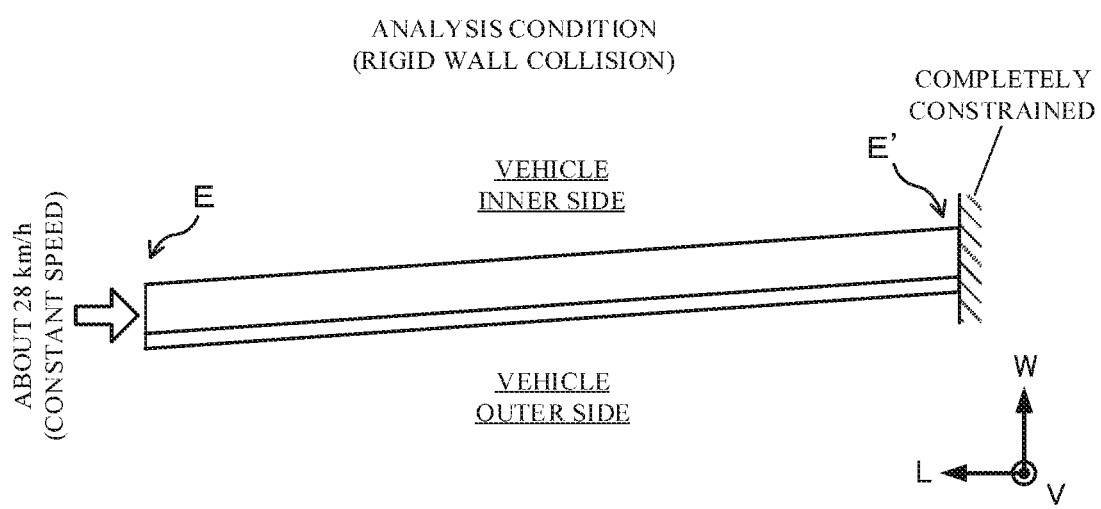
FIG. 42 is a view illustrating an analysis condition of the impact load input simulation.

An analysis condition is as indicated in FIG. 42, and a simulation was conducted by assuming a front-end collision (which is also referred to as a rigid wall collision). Concretely, a rigid wall abutted against the collision-side end portion E from a front side in the vehicle length direction L was moved at a constant speed of about 28 km/h to make the non-collision-side end portion E' to be in a completely constrained state. Note that although the model illustrated in FIG. 42 is the model of the comparative example, the simulation using the model of the example is also conducted based on the same analysis condition.

Figure 43:
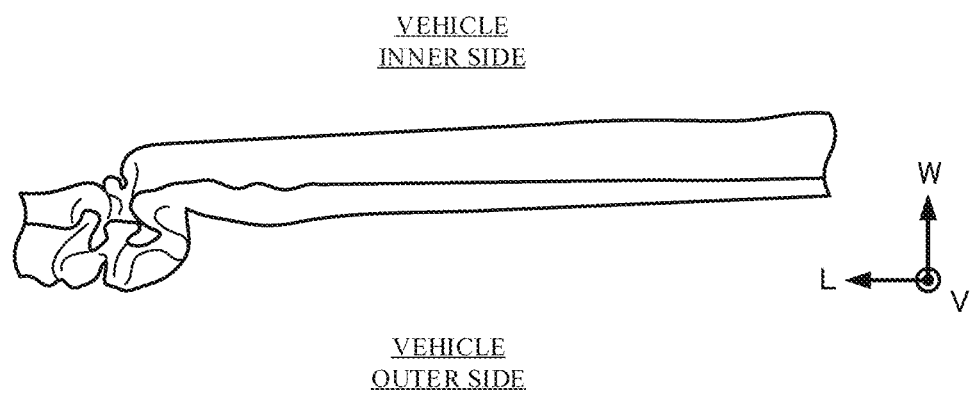
FIG. 43 is a view illustrating a deformation state of the impact-absorbing member in the example after the simulation.
Figure 44:
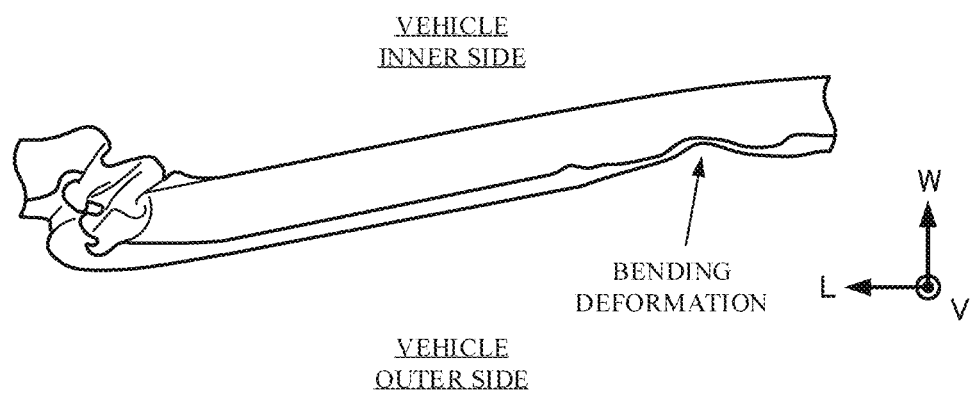
FIG. 44 is a view illustrating a deformation state of the impact-absorbing member in the comparative example after the simulation.

A deformation state of the impact-absorbing member in the example after the simulation is illustrated in FIG. 43. Further, a deformation state of the impact-absorbing member in the comparative example after the simulation is illustrated in FIG. 44. As illustrated in FIG. 43, in the impact-absorbing member of the example, it can be understood that no bending deformation occurs at the non-collision-side end portion, and a bellows-like axial collapse deformation occurs at the collision-side end portion. On the other hand, in the impact-absorbing member of the comparative example, it can be understood that the vicinity of the non-collision-side end portion is subjected to the bending deformation and thus it is bent, as illustrated in FIG. 44.

From the above description, it can be understood that the impact-absorbing member according to the present invention has an effect of suppressing the bending deformation at the non-collision-side end portion and stably causing the bellows-like axial collapse deformation at the collision-side end portion.

Figure 45:
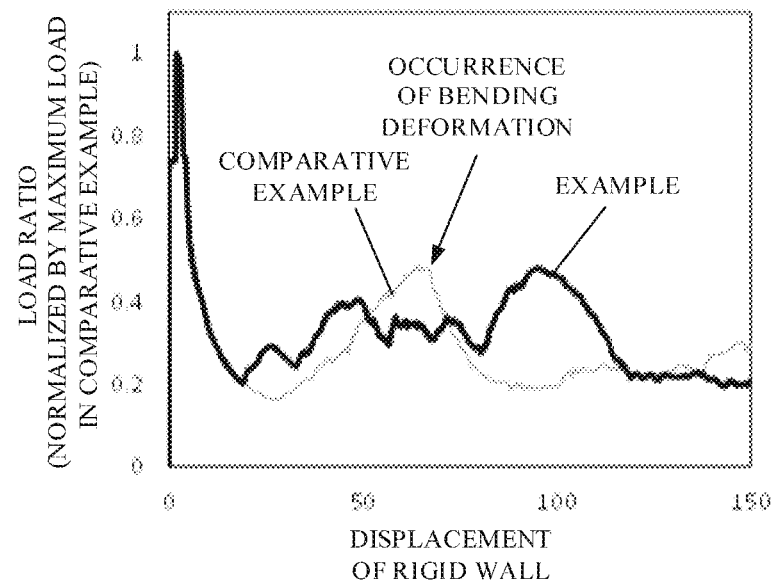
FIG. 45 is a view illustrating a relationship between a displacement of a rigid wall and an input load with respect to the impact-absorbing member.

Here, a relationship between the displacement of the rigid wall and the input load in the present simulation is illustrated in FIG. 45. Note that the "load ratio" on the vertical axis in FIG. 45 is obtained in a manner that the input load value of each of the example and the comparative example is divided by the maximum input load value of the comparative example to be normalized. As illustrated in FIG. 45, it can be understood that the load is stably input into the impact-absorbing member of the example, and the axial collapse deformation continuously occurs in accordance with the displacement of the rigid wall. On the other hand, in the impact-absorbing member of the comparative example, the bending deformation occurs in the middle thereof, and the input load thereafter becomes small.

Figure 46:
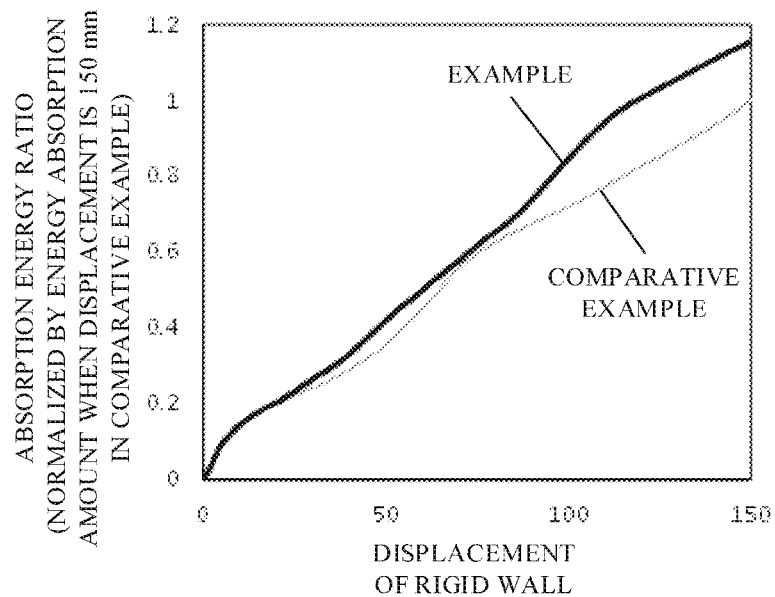
FIG. 46 is a view illustrating a relationship between the displacement of the rigid wall and an impact-absorbing energy of the impact-absorbing member.

Next, a relationship between the displacement of the rigid wall and an energy absorption amount is illustrated in FIG. 46, in which an integral value of the input load with respect to the displacement amount of the rigid wall is set to the energy absorption amount of the impact-absorbing member. Note that an "absorption energy ratio" on the vertical axis in FIG. 46 is obtained in a manner that an energy absorption amount of each of the example and the comparative example is divided by an energy absorption amount of the comparative example when the displacement of the rigid wall is 150 mm to be normalized. According to FIG. 46, it can be understood that the impact-absorbing member of the example has the energy absorption amount higher than that of the impact-absorbing member of the comparative example. Specifically, it can be understood that the impact-absorbing member according to the present invention has an effect of suppressing the bending deformation at the non-collision-side end portion and stably causing the bellows-like axial collapse deformation at the collision-side end portion, which improves the impact-absorbing performance.

INDUSTRIAL APPLICABILITY

Figure 2:
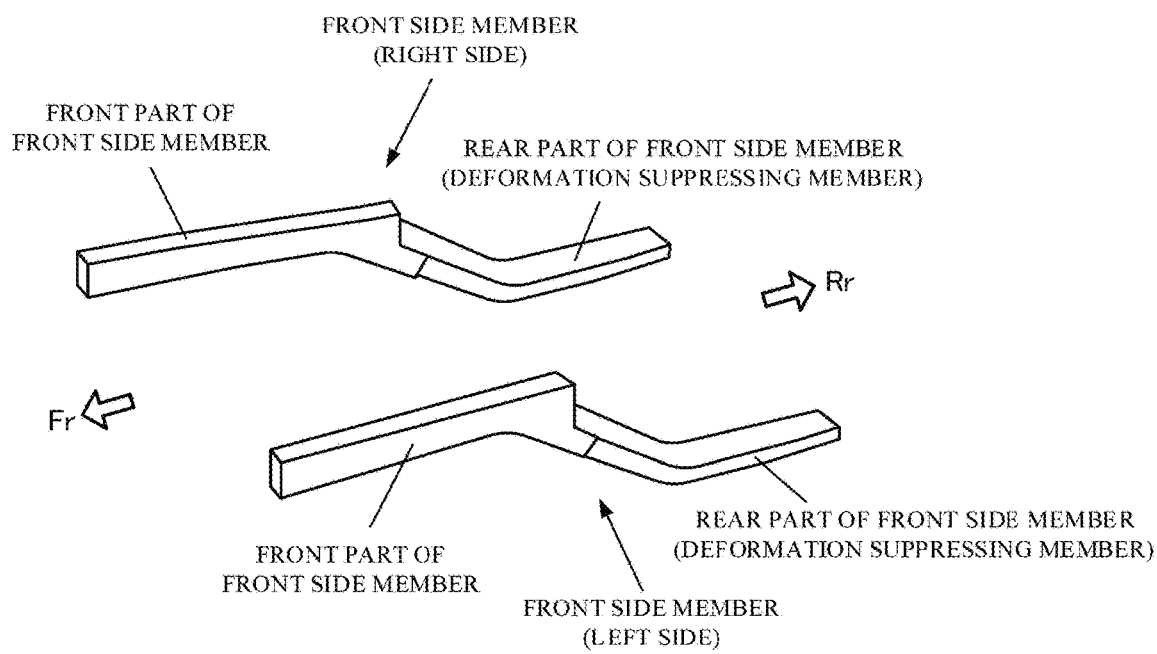
FIG. 2 is a perspective view illustrating one example of a shape of front side members.

The impact-absorbing member of the present invention can be incorporated into an impact-absorbing structure of an automobile. For example, according to the present invention, it is possible to configure a side member including a member having the impact-absorbing member, and a deformation suppressing member which is connected to a cabin side and which has a curved portion. In a case of a front side member, "a member having the impact-absorbing member" is, for example, a front part of a front side member as illustrated in FIG. 2, and "a deformation suppressing member which is connected to a cabin side and which has a curved portion" is, for example, a rear part of the front side member as illustrated in FIG. 2. Further, in a case of a rear side member, "a member having the impact-absorbing member" is, for example, a rear part of a rear side member as illustrated in FIG. 4, and "a deformation suppressing member which is connected to a cabin side and which has a curved portion" is, for example, a front part of the rear side member as illustrated in FIG. 4. Further, the impact-absorbing member of the present invention can also be provided to an end portion in the vehicle length direction of a side sill as illustrated in FIG. 1.

EXPLANATION OF CODES 1 impact-absorbing member
2 outer member
2a flange portion of outer member
2b top portion of outer member
3 inner member
3a flange portion of inner member
3b top portion of inner member
51 conventional impact-absorbing member
52 conventional outer member
52a flange portion of conventional outer member
53 conventional inner member
53a flange portion of conventional inner member
E collision-side end portion of impact-absorbing member
E' non-collision-side end portion of impact-absorbing member
G gravity center
$G_0$ gravity center at collision-side end portion
$G_{in}$ length from gravity center to top portion of inner member
$G_{out}$ length from gravity center to top portion of outer member
$H_{in}$ hat height of inner member
$H_{out}$ hat height of outer member
J joined surface between outer member and inner member
L vehicle length direction
L1 length in vehicle length direction of impact-absorbing member
N neutral axis
V vertical direction
$V_0$ offset amount of collision-side end portion relative to non-collision-side end portion in vertical direction
$V_{in}$ length in vertical direction from top portion of inner member to joined surface at collision-side end portion
$V_{in}'$ length in vertical direction from top portion of inner member to joined surface at non-collision-side end portion
$V_{out}$ length in vertical direction from top portion of outer member to joined surface at collision-side end portion
$V_{out}'$ length in vertical direction from top portion of outer member to joined surface at non-collision-side end portion
W vehicle width direction
$W_0$ offset amount of collision-side end portion relative to non-collision-side end portion in vehicle width direction
$W_{in}$ length in vehicle width direction from top portion of inner member to joined surface at collision-side end portion
$W_{in}'$ length in vehicle width direction from top portion of inner member to joined surface at non-collision-side end portion
$W_{out}$ length in vehicle width direction from top portion of outer member to joined surface at collision-side end portion
$W_{out}'$ length in vehicle width direction from top portion of outer member to joined surface at non-collision-side end portion

The invention claimed is:

1. An impact-absorbing member of an automobile, which extends in a vehicle length direction of the automobile and whose both end portions in the vehicle length direction are offset so that positions of the both end portions become mutually different when seen from the vehicle length direction, the impact-absorbing member of the automobile comprising
a hat-shaped outer member and a hat-shaped inner member which are mutually joined at flange portions, wherein
when a ratio between a length $G_{in}$, which is the length in an offset direction from a gravity center of a cross section of the outer member and the inner member perpendicular to the vehicle length direction to a top portion of the inner member, and a length $G_{out}$, which is the length in the offset direction from the gravity center of the cross section to a top portion of the outer member, $(G_{in}/G_{out})$ is defined as a ratio of gravity centers, the ratio of gravity centers increases from a side of the end portion, selected from the both end portions, whose position is offset toward a vehicle outer side when seen from the vehicle length direction, toward another side of the end portion, whose position is offset toward a vehicle inner side when seen from the vehicle length direction.

2. An impact-absorbing member of an automobile, which extends in a vehicle length direction of the automobile and whose both end portions in the vehicle length direction are offset so that positions of the both end portions become mutually different when seen from the vehicle length direction, the impact-absorbing member of the automobile comprising a hat-shaped outer member and a hat-shaped inner member which are mutually joined at flange portions, wherein when ratio between a hat height of $H_{in}$ of the inner member and a hat height $H_{out}$ of the outer member in a cross section perpendicular to the vehicle length direction of the outer member and the inner member $(H_{in}/H_{out})$ is defined as a ratio of hat heights, the ratio of hat heights increases from a side of the end portion, out of the both end portions, whose position is offset toward a vehicle outer side when seen from the vehicle length direction, toward another side of the end portion, whose position is offset toward a vehicle inner side when seen from the vehicle length direction.

3. The impact-absorbing member of the automobile according to claim 1, wherein a flange projecting direction is a vertical direction, and the offset direction is a vehicle width direction.

4. The impact-absorbing member of the automobile according to claim 3, wherein:

the both end portions are formed of a collision-side end portion and a non-collision-side end portion;

when a length in the vehicle width direction from the top portion of the outer member to a joined surface between the outer member and the inner member at the collision-side end portion is set to $W_{out}$, a length in the vehicle width direction from the top portion of the outer member to the joined surface at the non-collision-side end portion is set to $W_{out}'$, a length in the vehicle width direction from the top portion of the inner member to the joined surface at the collision-side end portion is set to $W_{in}$, and a length in the vehicle width direction from the top portion of the inner member to the joined surface at the non-collision-side end portion is set to $W_{in}'$, $W_{out} \geq W_{out}' \times 2.8$ is satisfied when the collision-side end portion is positioned on the vehicle outer side in the vehicle width direction relative to the non-collision-side end portion; and $W_{in} \geq W_{in}' \times 2.8$ is satisfied when the collision-side end portion is positioned on the vehicle inner side in the vehicle width direction relative to the non-collision-side end portion.

5. The impact-absorbing member of the automobile according to claim 4, wherein:

the both end portions are formed of a collision-side end portion and a non-collision-side end portion;

when a length in the vehicle width direction from the top portion of the outer member to a joined surface between the outer member and the inner member at the non-collision-side end portion is set to $W_{out}'$, and a length in the vehicle width direction from the top portion of the inner member to the joined surface at the non-collision-side end portion is set to $W_{in}'$, $W_{out}' \geq 8$ mm is satisfied when the collision-side end portion is positioned on the vehicle outer side in the vehicle width direction relative to the non-collision-side end portion; and $W_{in}' \geq 8$ mm is satisfied when the collision-side end portion is positioned on the vehicle inner side in the vehicle width direction relative to the non-collision-side end portion.

6. The impact-absorbing member of the automobile according to claim 1, wherein a flange projecting direction is a vehicle width direction, and the offset direction is a vertical direction.

7. The impact-absorbing member of the automobile according to claim 6, wherein:

the both end portions are formed of a collision-side end portion and a non-collision-side end portion;

when a length in the vertical direction from the top portion of the outer member to a joined surface between the outer member and the inner member at the collision-side end portion is set to $V_{out}$, a length in the vertical direction from the top portion of the outer member to the joined surface at the non-collision-side end portion is set to $V_{out}'$, a length in the vertical direction from the top portion of the inner member to the joined surface at the collision-side end portion is set to $V_{in}$, and a length in the vertical direction from the top portion of the inner member to the joined surface at the non-collision-side end portion is set to $V_{in}'$, $V_{out} \geq V_{out}' \times 2.8$ is satisfied when the collision-side end portion is positioned on the vehicle outer side in the vertical direction relative to the non-collision-side end portion; and $V_{in} \geq V_{in}' \times 2.8$ is satisfied when the collision-side end portion is positioned on the vehicle inner side in the vertical direction relative to the non-collision-side end portion.

8. The impact-absorbing member of the automobile according to claim 7, wherein:

the both end portions are formed of a collision-side end portion and a non-collision-side end portion;

when a length in the vertical direction from the top portion of the outer member to a joined surface between the outer member and the inner member at the non-collision-side end portion is set to $V_{out}'$, and a length in the vertical direction from the top portion of the inner member to the joined surface at the non-collision-side end portion is set to $V_{in}'$, $V_{out}' \geq 8$ mm is satisfied when the collision-side end portion is positioned on the vehicle outer side in the vertical direction relative to the non-collision-side end portion; and $V_{in}' \geq 8$ mm is satisfied when the collision-side end portion is positioned on the vehicle inner side in the vertical direction relative to the non-collision-side end portion.

9. A side member of an automobile, comprising: a member having the impact-absorbing member according to claim 1; and a deformation suppressing member which is connected to a cabin side and which has a curved portion.

10. The side member of the automobile according to claim 9, which is used as a front side member.

11. The side member of the automobile according to claim 9, which is used as a rear side member.

\* \* \* \* \*